(12) United States Patent
Yamamoto

(10) Patent No.: US 10,266,229 B2
(45) Date of Patent: Apr. 23, 2019

(54) BICYCLE CONTROLLER AND BICYCLE TRANSMISSION SYSTEM

(71) Applicant: Shimano Inc., Sakai, Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/412,552

(22) Filed: Jan. 23, 2017

(65) Prior Publication Data

US 2017/0217538 A1     Aug. 3, 2017

(30) Foreign Application Priority Data

Jan. 29, 2016  (JP) .................................. 2016-016390

(51) Int. Cl.
| | |
|---|---|
| *B62M 6/55* | (2010.01) |
| *B62M 9/10* | (2006.01) |
| *B62M 11/14* | (2006.01) |
| *F16H 37/06* | (2006.01) |
| *F16H 61/02* | (2006.01) |
| *F16H 61/70* | (2006.01) |
| *B62M 6/45* | (2010.01) |

(52) U.S. Cl.
CPC ................ *B62M 6/55* (2013.01); *B62M 6/45* (2013.01); *B62M 9/10* (2013.01); *B62M 11/145* (2013.01); *F16H 37/065* (2013.01); *F16H 61/0204* (2013.01); *F16H 61/702* (2013.01); *B60Y 2200/13* (2013.01)

(58) Field of Classification Search
CPC .... F16H 59/70; F16H 2702/02; F16H 37/065; B62M 6/45; B62M 6/55; B62M 9/10; B62M 9/122
See application file for complete search history.

(56) References Cited

U.S. PATENT DOCUMENTS

| | | | |
|---|---|---|---|
| 2015/0088389 A1 | 3/2015 | Gao | |
| 2015/0307157 A1* | 10/2015 | Gao | ........................ B62M 6/45 701/52 |

(Continued)

FOREIGN PATENT DOCUMENTS

| | | |
|---|---|---|
| JP | 9-150779 A | 6/1997 |
| JP | 2623419 B2 | 6/1997 |
| JP | 10-203466 A | 8/1998 |

(Continued)

*Primary Examiner* — Stacy A Fluhart
(74) *Attorney, Agent, or Firm* — Global IP Counselors, LLP

(57) ABSTRACT

A bicycle controller limits decreases in the assist force when the rotational speed of a crank changes. The bicycle controller can be mounted on a bicycle including a first transmission having at least two shift stages and configured to change a ratio of rotation of a wheel to rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank. The bicycle controller includes an electronic control unit that controls the second transmission in accordance with a condition of the bicycle and either one of a condition of the first transmission and a shift instruction to the first transmission.

17 Claims, 14 Drawing Sheets

(56) References Cited

U.S. PATENT DOCUMENTS

2017/0029065 A1\* 2/2017 Hayslett .................. B62M 6/50
2017/0106866 A1\* 4/2017 Schieffelin ............ B62M 9/122

FOREIGN PATENT DOCUMENTS

| JP | 11-180376 A | 7/1999 |
| --- | --- | --- |
| JP | 11-227669 A | 8/1999 |
| JP | 2003-095182 A | 4/2003 |
| JP | 4056130 B2 | 3/2008 |
| JP | 2015-63222 A | 4/2015 |

\* cited by examiner

BICYCLE CONTROLLER AND BICYCLE TRANSMISSION SYSTEM

CROSS-REFERENCE TO RELATED APPLICATIONS

This application claims priority to Japanese Patent Application No. 2016-016390, filed on Jan. 29, 2016. The entire disclosure of Japanese Patent Application No. 2016-016390 is hereby incorporated herein by reference.

BACKGROUND

Field of the Invention

The present disclosure generally relates to a bicycle controller and a bicycle transmission system.

Background Information

A known bicycle transmission system includes a motor that provides assistance to human power. In addition to the motor, the bicycle transmission system includes a speed reducer and a resultant force member. Rotation is transmitted to the resultant force member from the speed reducer and a crank. Japanese Patent No. 2,623,419 describes one example of a conventional bicycle transmission system.

In the conventional bicycle transmission system, the rotational speed of the motor is proportional to the rotational speed of the crank. The motor has a characteristic in which the output torque changes in accordance with its rotational speed. Depending on the rotational speed of the crank, the output torque of the motor may become insufficient and decrease the assist force or lower the motor driving efficiency.

SUMMARY

One object of the subject matter of the present disclosure is to provide a bicycle controller and a bicycle transmission system that limit decreases in the assist force when the rotational speed of the crank changes.

A first aspect of the subject matter of the present disclosure is a bicycle controller configured to be mounted on a bicycle including a first transmission having at least two shift stages and configured to change ratio of rotation of a wheel to rotation of a crank, a motor that provides assistance to human power input to the crank, and a second transmission configured to transmit rotation force from the motor to a power transmission path extending from the crank to the wheel without changing the ratio of the rotation of the wheel to the rotation of the crank. The bicycle controller includes an electronic control unit that is configured to control the second transmission in accordance with a condition of the bicycle and one of a condition of the first transmission and a shift instruction to the first transmission.

A second aspect of the subject matter of the present disclosure is a bicycle controller that can be mounted on a bicycle including a first transmission having at least two shift stages and configured to change ratio of rotation of a wheel to rotation of a crank, a motor that provides assistance to human power input to the crank, and a second transmission configured to transmit rotation force from the motor to a power transmission path extending from the crank to the wheel without changing the ratio of the rotation of the wheel to the rotation of the crank. The bicycle controller includes an electronic control unit that is configured to control the first transmission and the second transmission in accordance with a condition of the bicycle.

In a third aspect of the bicycle controller according to any one of the preceding aspects, the condition of the bicycle includes at least one of torque produced by the human power and a rotational speed of at least one of the crank and the motor.

In a fourth aspect of the bicycle controller according to any one of the preceding aspects, the electronic control unit controls the second transmission to increase a transmission ratio of the second transmission upon determining operation of the first transmission causes the rotational speed to exceed a first predetermined rotational speed.

In a fifth aspect of the bicycle controller according to any one of the preceding aspects, the electronic control unit is configured to predict, from the rotational speed and one of a condition of the first transmission and a shift instruction to the first transmission, whether or not the operation of the first transmission will cause the rotational speed to change to a value that exceeds the first predetermined rotational speed.

In a sixth aspect of the bicycle controller according to any one of the preceding aspects, the electronic control unit is configured to control the second transmission to increase a transmission ratio of the second transmission upon determining the rotational speed exceeds the first predetermined rotational speed without operating the first transmission.

In a seventh aspect of the bicycle controller according to any one of the preceding aspects, the electronic control unit is configured to control the second transmission to decrease a transmission ratio of the second transmission upon determining operation of the first transmission causes the rotational speed to be lower than a second predetermined rotational speed.

In an eighth aspect of the bicycle controller according to any one of the preceding aspects, the electronic control unit is configured to predict, from the rotational speed and one of a condition of the first transmission and a shift instruction to the first transmission, whether or not operation of the first transmission will cause the rotational speed to change to a value that is lower than the second predetermined rotational speed.

In a ninth aspect of the bicycle controller according to any one of the preceding aspects, the electronic control unit is configured to control the second transmission to decrease a transmission ratio of the second transmission upon determining the rotational speed becomes lower than the second predetermined rotational speed without operating the first transmission.

In a tenth aspect of the bicycle controller according to any one of the preceding aspects, the first rotational speed is higher than the second rotational speed.

In an eleventh aspect of the bicycle controller according to any one of the preceding aspects, the electronic control unit is configured to control the second transmission to increase a transmission ratio of the second transmission upon determining operation of the first transmission causes the torque to be lower than a first predetermined torque.

In a twelfth aspect of the bicycle controller according to any one of the preceding aspects, the electronic control unit is configured to predict, from the torque and one of a condition of the first transmission and a shift instruction to the first transmission, whether or not operation of the first transmission will cause the torque to a value lower than the first predetermined torque.

In a thirteenth aspect of the bicycle controller according to any one of the preceding aspects, the electronic control unit is configured to control the second transmission to decrease a transmission ratio of the second transmission upon determining the torque exceeds a second predetermined torque by operating the first transmission.

In a fourteenth aspect of the bicycle controller according to any one of the preceding aspects, the electronic control unit is configured to predict, from the torque and one of a condition of the first transmission and a shift instruction to the first transmission, whether or not operation of the first transmission will cause the torque to change to a value exceeding the second torque.

In a fifteenth aspect of the bicycle controller according to any one of the preceding aspects, the electronic control unit is configured to control the first transmission to maintain the rotational speed of the crank within a predetermined range.

In a sixteenth aspect of the bicycle controller according to any one of the preceding aspects, the electronic control unit is configured to operate the first transmission and the second transmission in at least one of a predetermined order and simultaneously operates the first transmission and the second transmission.

In a seventeenth aspect of the bicycle controller according to any one of the preceding aspects, the predetermined range includes an upper limit value that is higher than the first rotational speed, and the predetermined range includes a lower limit value that is lower than the second predetermined rotational speed.

An eighteenth aspect of the subject matter of the present disclosure is a bicycle transmission system including the bicycle controller according to any one of the preceding aspects, the first transmission, and the second transmission.

A nineteenth aspect of the bicycle transmission system according to the eighteenth aspect further includes a housing in which at least the second transmission is arranged. The housing rotationally supports a crankshaft.

A twentieth aspect of the subject matter of the present disclosure is a bicycle transmission system including a first transmission configured to change a ratio of rotation of a wheel to rotation of a crank in a bicycle and a second transmission configured to include at least two shift stages and is configured to transmit a rotation force from a motor to a power transmission path extending from the crank to the wheel in any one of the shift stages without changing the ratio of the rotation of the wheel to the rotation of the crank.

In a twenty-first aspect of the bicycle transmission system according to the twentieth aspect, the second transmission is configured to transmit the rotation force from the motor to an upstream side of the first transmission in the power transmission path.

In a twenty-second aspect of the bicycle transmission system according to the twentieth or twenty-first aspect, the first transmission includes at least one of a front transmission located near the crank and a rear transmission located near an axle of a rear wheel.

In a twenty-third aspect of the bicycle transmission system according to any one of the twentieth to twenty-second aspect, the first transmission includes a front transmission located near the crank, and the second transmission transmits the rotation force from the motor to a downstream side of the front transmission in the power transmission path.

A twenty-fourth aspect of the bicycle transmission system according to any one of the twentieth to twenty-third aspect further includes the bicycle controller according to any one of the first to seventeenth aspect.

The bicycle controller and the bicycle transmission system according to the subject matter of the present disclosure limit decreases in the assist force upon determining the rotational speed of the crank changes.

DESCRIPTION OF THE EMBODIMENTS

Selected embodiments of a bicycle drive unit will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a bicycle transmission system will now be described with reference to FIGS. 1 to 8.

Figure 1:
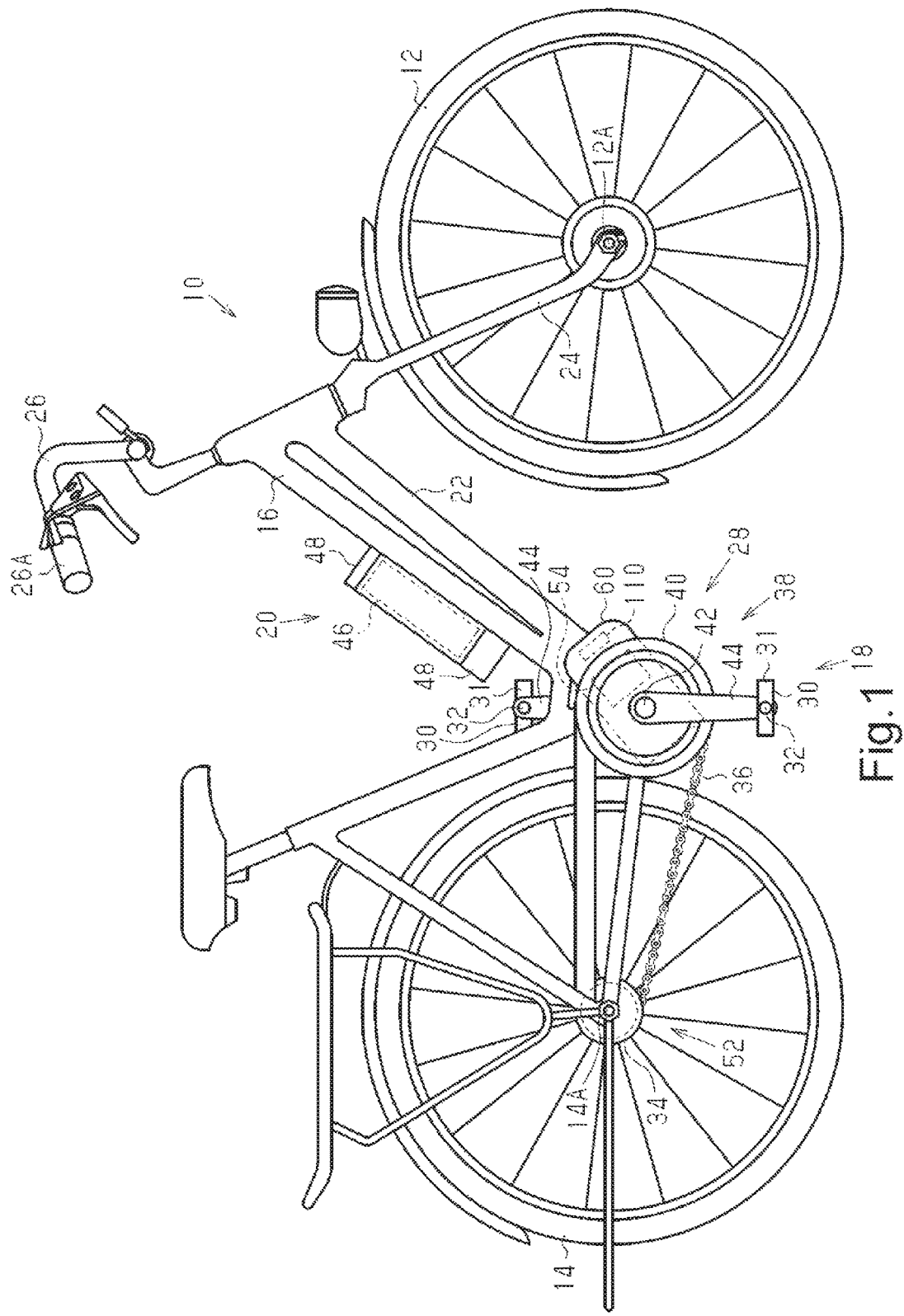
FIG. 1 is a side elevational view of a bicycle including a bicycle transmission system in accordance with a first embodiment.

Referring to FIG. 1, a transmission system 50 is mounted on a bicycle 10 that includes a front wheel 12, a rear wheel 14, a body 16, a drive mechanism 18 and a battery unit 20. The rear wheel 14 serves as a wheel. The body 16 includes a frame 22, a front fork 24, a stem 26 and a handlebar 26A. The front fork 24 is connected to the frame 22, and the handlebar 26A is attached in a removable manner to the front fork 24 by the stem 26. The front fork 24 is supported by the frame 22 and connected to an axle 12A of the front wheel 12.

The drive mechanism 18 includes a crank assembly 28, two pedals 30, a rear sprocket 34 and a chain 36.

The crank assembly 28 includes a crank 38 and a front sprocket 40. The crank 38 includes a crankshaft 42 and two crank arms 44. The crankshaft 42 is rotationally supported by the frame 22. The crank arms 44 are coupled to the crankshaft 42. The pedals 30 each include a pedal body 31 and a pedal shaft 32. The pedal shaft 32 is coupled to a corresponding one of the crank arms 44. The pedal body 31 is supported by the corresponding pedal shaft 32 in a manner rotatable to the pedal shaft 32.

The front sprocket 40 is coupled to the crankshaft 42. The front sprocket 40 is coaxial with the crankshaft 42. The front sprocket 40 can be coupled to the crankshaft 42 so as to be non-rotatable relative to the crankshaft 42. Alternatively, the front sprocket 40 can be coupled by a first clutch 62 (refer to FIG. 4) to the crankshaft 42 so that when the crankshaft 42 rotates in the forward direction, the front sprocket 40 also rotates in the forward direction.

The rear sprocket 34 is coupled to the rear wheel 14 so as to be rotatable about an axle 14A of the rear wheel 14. The rear sprocket 34 is coupled by a second clutch (not shown) to the rear wheel 14. The second clutch is a one-way clutch. The chain 36 is wounded to the front sprocket 40 and the rear sprocket 34. When the crankshaft 42 is rotated by human power applied to the pedals 30, the front sprocket 40, the chain 36, and the rear sprocket 34 rotate the rear wheel 14.

The battery unit 20 includes a battery 46 and a battery holder 48, which is used to couple the battery 46 to the frame 22 in a removable manner. The battery 46 includes one or more battery cells. The battery 46 is rechargeable and electrically connected to a motor 56 to supply the motor 56 with power.

Figure 2:
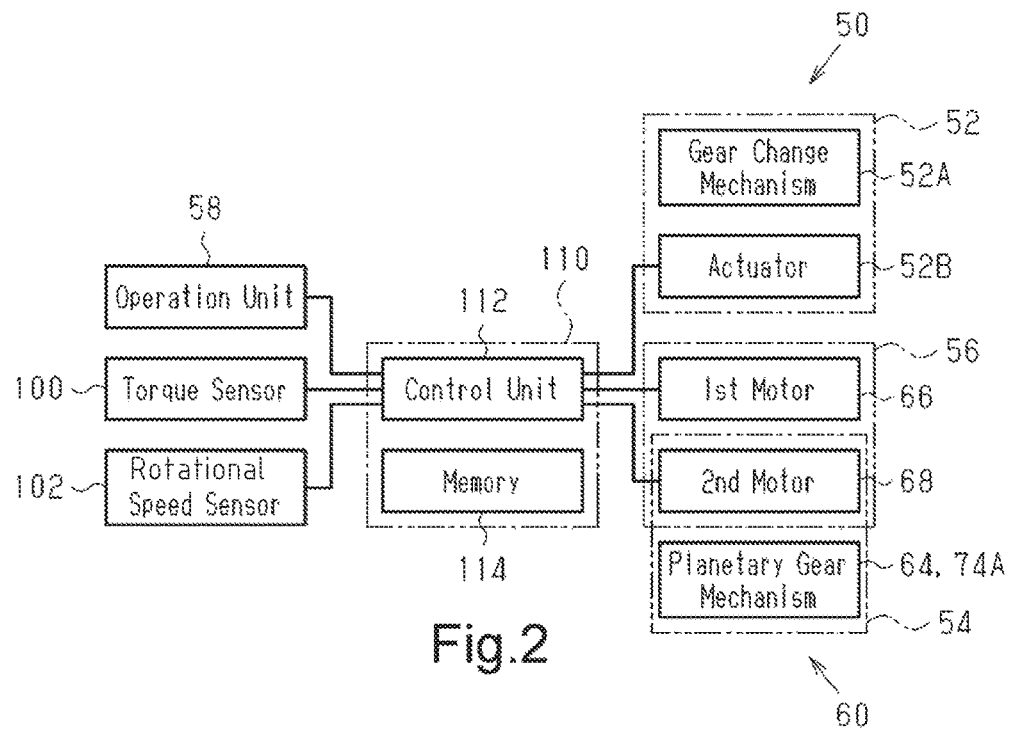
FIG. 2 is a block diagram of the bicycle transmission system in accordance with a first embodiment.

Referring to FIG. 2, the transmission system 50 includes a first transmission 52, a second transmission 54 and the motor 56. In one example, the transmission system 50 further includes an operation unit 58 and a bicycle controller (hereinafter referred to as "the controller 110"). The motor 56, the second transmission 54, and the controller 110 form a drive unit 60. The controller 110 is configured to be installed in the bicycle 10 that includes the motor 56, the first transmission 52 and the second transmission 54.

Figure 3:
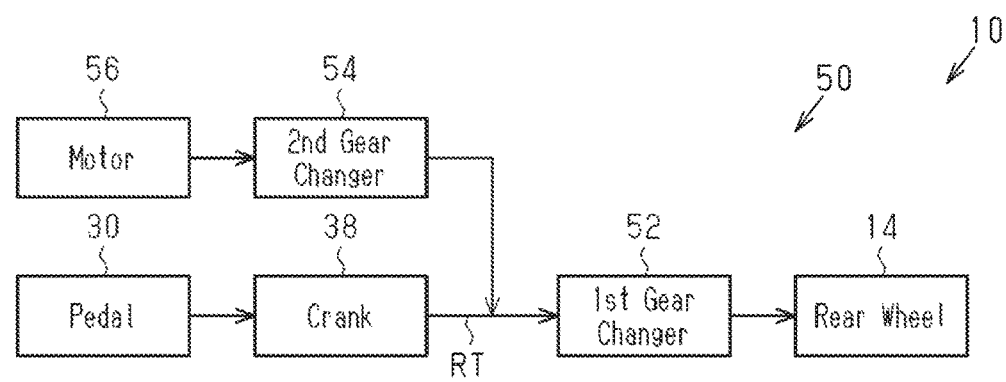
FIG. 3 is schematic diagram of a bicycle power transmission path in the bicycle transmission system in accordance with the first embodiment.

Referring to FIG. 3, the first transmission 52 is located in a power transmission path RT extending from the crank 38 to the rear wheel 14. The first transmission 52 includes an internal hub transmission that is integrated with the hub of the rear wheel 14. The first transmission 52 changes the ratio of the rotation of the rear wheel 14 to the rotation of the crank 38. The first transmission 52 shown in FIG. 2 includes a gear change mechanism 52A and an actuator 52B. The gear change mechanism 52A includes, for example, a planetary gear mechanism. The first transmission 52 includes at least two shift stages. The actuator 52B functions to switch the connected gears of the gear change mechanism 52A and change the shift stage of the first transmission 52. This changes the transmission ratio (gear ratio) r1 of the bicycle. The transmission ratio r1 of the bicycle 10 corresponds to the ratio of the rotational speed of the rear wheel 14 to the rotational speed of the crank 38 shown in FIG. 1.

Figure 4:
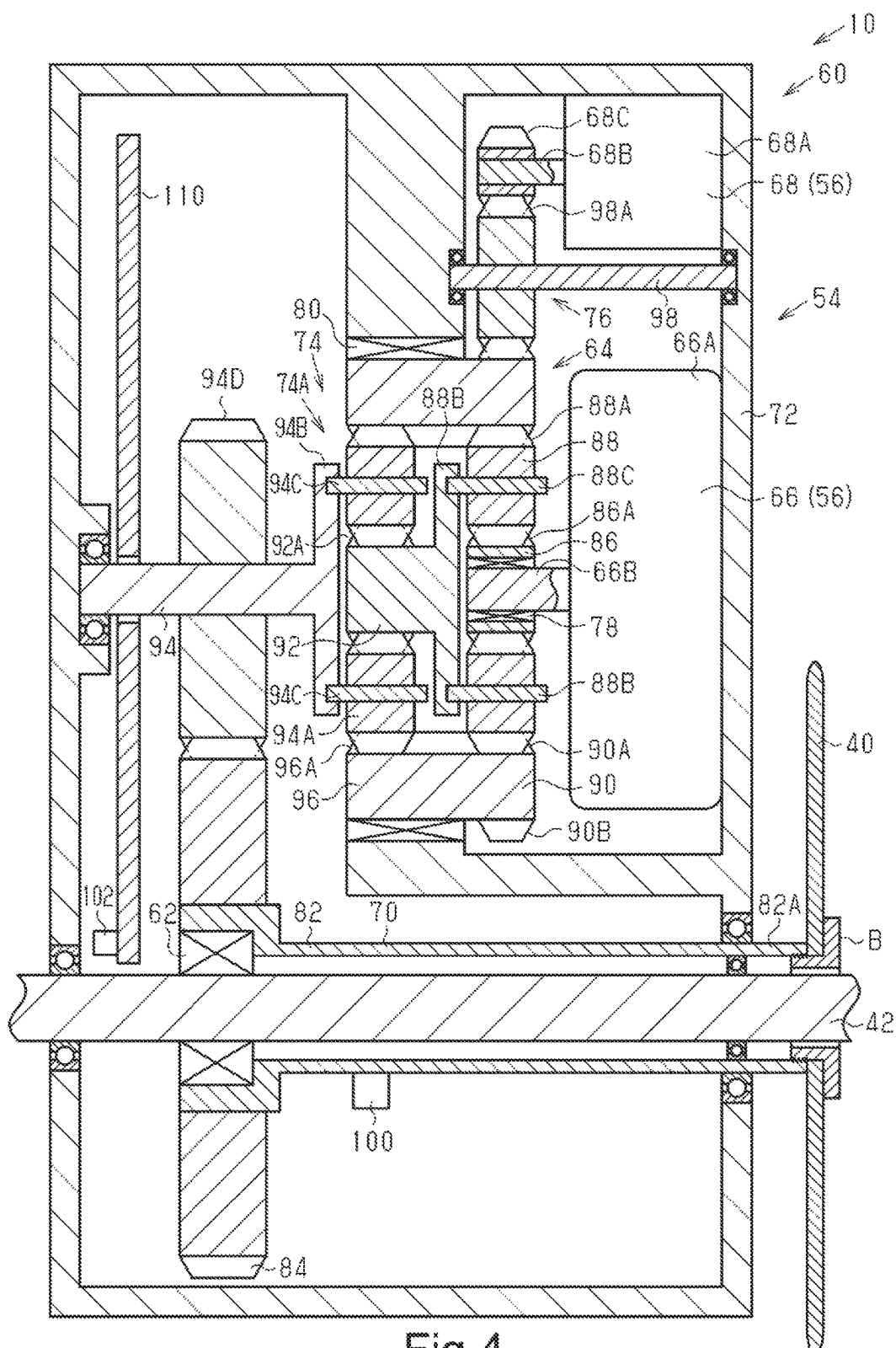
FIG. 4 is a cross-sectional view of a drive unit of the bicycle transmission system in accordance with the first embodiment.

As shown in FIG. 3, the second transmission 54 transmits a rotation force from the motor 56 to the upstream side of the first transmission 52 in the power transmission path RT, which extends from the crank 38 to the rear wheel 14. In any shift stage of the first transmission 52, the second transmission 54 is configured to transmit the rotation force of the motor 56 to the power transmission path RT, which extends from the crank 38 to the rear wheel 14, without changing the ratio of the rotation of the rear wheel 14 to the rotation of the crank 38. The second transmission 54 and the motor 56 are arranged in a housing 72 of the drive unit 60, which are shown in FIG. 4. The drive unit 60 functions to provide assistance to the human power input to the crankshaft 42. The drive unit 60 is coupled in a removable manner to the frame 22 of the bicycle 10 (refer to FIG. 1). The drive unit 60 and the frame 22 can be joined together by, for example, bolts.

The operation unit 58 shown in FIG. 2 is coupled to the handlebar 26A (refer to FIG. 1). The operation unit 58 transmits signals for operating the first transmission 52 to the controller 110. When operated by the rider, the operation unit 58 transmits a shift-up signal or a shift-down signal to the controller 110. The shift-up signal increases the transmission ratio r1 of the bicycle, and the shift-down signal decreases the transmission ratio r1 of the bicycle.

As shown in FIG. 4, the drive unit 60 includes a first planetary gear mechanism 64, the motor 56 and a resultant force member 70. The motor 56 includes a first motor 66 and a second motor 68. One example of the first motor 66 is an electric motor. One example of the second motor 68 is an electric motor. In one example, the drive unit 60 further includes the crankshaft 42, the housing 72, a first speed reduction mechanism 74, a second speed reduction mechanism 76, a first one-way clutch 78 and a second one-way clutch 80.

At least the first motor 66 provides assistance to the human power input to the crank 38. The second motor 68 controls the rotation of a first transmission body 90 of the first planetary gear mechanism 64 and the rotation of a second transmission body 96 of a second planetary gear mechanism 74A to change the ratio of the speed of the rotational output from the second planetary gear mechanism 74A to the speed of the rotational input to the first planetary gear mechanism 64 from the first motor 66. The ratio of the speed of the rotational output from the second planetary gear mechanism 74A to the speed of the rotational input to the first planetary gear mechanism 64 is the transmission ratio r2 of the second transmission 54. The second transmission 54 includes the first planetary gear mechanism 64, the second planetary gear mechanism 74A, and the second motor 68.

The crankshaft 42 is supported by the drive unit 60 and rotatable relative to the drive unit 60. The two ends of the crankshaft 42 project out of the housing 72. The crankshaft 42 is rotationally supported by the housing 72. The first motor 66, the second transmission 54, the first one-way clutch 78, the second one-way clutch 80, the first speed reduction mechanism 74 and the controller 110 are arranged in the housing 72.

Rotation of a first output body 88, which will be described later, is transmitted to the resultant force member 70. Further, rotation produced by human power is transmitted to the resultant force member 70 detouring the first planetary gear mechanism 64. The resultant force member 70 includes a hollow shaft 82 and a gear 84. The hollow shaft 82 is supported by the housing 72 in a manner rotatable to the housing 72. The resultant force member 70 is rotatable about the axis of the crankshaft 42. The hollow shaft 82 includes an end 82A that projects out of the housing 72. The crankshaft 42 is inserted into the hollow shaft 82 so that the two ends of the crankshaft 42 project out of the housing 72. The crankshaft 42 is supported by the housing 72 with the hollow shaft 82. The gear 84 is coupled to the hollow shaft 82 in a non-rotatable manner to the hollow shaft 82. The gear 84 is coaxial with the hollow shaft 82. In another example, the gear 84 is formed integrally with the hollow shaft 82 by machining the hollow shaft 82.

The first clutch 62 is arranged between the outer circumference of the crankshaft 42 and the inner circumference of the resultant force member 70. The first clutch 62 is a one-way clutch. When the crankshaft 42 is rotated in the forward direction, the first clutch 62 transmits the rotation from the crankshaft 42 to the resultant force member 70. When the crankshaft 42 is rotated in the rearward direction, the first clutch 62 connects to the crankshaft 42 and the resultant force member 70 so as to cut the transmission of rotation from the crankshaft 42 to the resultant force member 70.

The front sprocket 40 is arranged outside and beside the housing 72. The front sprocket 40 is coupled by a bolt B to the drive unit 60. The bolt B is fastened to the resultant force member 70 so that the front sprocket 40 is fixed between the bolt B and the resultant force member 70.

When human power that rotates the crankshaft 42 shown in FIG. 1 in the forward direction is input to the pedals 30, the crankshaft 42 rotates in the forward direction relative to the frame of the bicycle 10. In this case, the rotation of the crankshaft 42 is transmitted by the first clutch 62 and the resultant force member 70 to the front sprocket 40. When human power that rotates the crankshaft 42 in the rearward direction is input to the pedals 30, the crankshaft 42 rotates in the rearward direction relative to the frame 22. In this case, the first clutch 62 functions to cut the transmission of the rotation of the crankshaft 42 to the resultant force member 70 and the front sprocket 40.

As shown in FIG. 4, the first planetary gear mechanism 64 includes a first input body 86, the first output body 88 and the first transmission body 90.

The first input body 86 includes a sun gear 86A coupled to an output shaft 66B of the first motor 66. The sun gear 86A is arranged on the output shaft 66B and rotatable integrally with the output shaft 66B. The first one-way clutch 78 is arranged between the sun gear 86A and the output shaft 66B. When the crankshaft 42 is rotated in the forward direction by human power, the first one-way clutch 78 restricts transmission of the human power to the output shaft 66B of the second motor 68. The forward rotation of the crankshaft 42 is the rotation direction of the crankshaft 42 that moves the bicycle 10 forward. Further, the first one-way clutch 78 is, for example, a roller clutch. If the rotational speed of the first input body 86 is equal to the rotational speed of the output shaft 66B when the output shaft 66B rotates in a first direction, then the first one-way clutch 78 transmits the rotation of the output shaft 66B to the first input body 86. If the rotational speed of the first input body 86 is higher than the rotational speed of the output shaft 66B when the output shaft 66B rotates in the first direction, then the first one-way clutch 78 connects to the output shaft 66B and the first input body 86 so as to cut the transmission of the rotation of the output shaft 66B to the first input body 86. In this manner, the first one-way clutch 78 functions so that the human power that rotates the crankshaft 42 in the forward direction does not rotate an output shaft 68B of the second motor 68.

The first output body 88 includes a plurality of planetary gears 88A and a carrier 88B. The planetary gears 88A are engaged with the first input body 86. The carrier 88B rotationally supports the planetary gears 88A. Preferably, the first planetary gear mechanism 64 includes the planetary gears 88A.

The first transmission body 90 transmits the rotation of the first input body 86 to the first output body 88. The first transmission body 90 includes a ring gear 90A engaged with the first output body 88. The ring gear 90A extends around the sun gear 86A, and is coaxial with the sun gear 86A. The first transmission body 90 is supported by the second one-way clutch 80 on the housing 72. The second one-way clutch 80 is, for example, a roller clutch. The second one-way clutch 80 restricts rotation of the first transmission body 90 in a predetermined direction. More specifically, the first transmission body 90 is rotatable relative to the housing 72 in a first direction and non-rotatable relative to the housing 72 in a second direction.

The planetary gears 88A are arranged between the sun gear 86A and the ring gear 90A. The planetary gears 88A are engaged with the sun gear 86A and the ring gear 90A. The carrier 88B rotationally supports each planetary gear 88A with a planetary pin 88C that extends through the planetary gear 88A in the axial direction. In a further example, the planetary pins 88C can be rotated integrally with the corresponding one of the planetary gears 88A and rotationally supported by the carrier 88B.

The first speed reduction mechanism 74 reduces the speed of the rotation of the first output body 88, and transmits the rotation to the resultant force member 70. The first speed reduction mechanism 74 includes the second planetary gear mechanism 74A. The second planetary gear mechanism 74A is coaxial with the first planetary gear mechanism 64. The second planetary gear mechanism 74A is located next to the first planetary gear mechanism 64 in the axial direction of the first planetary gear mechanism 64.

The second planetary gear mechanism 74A includes a second input body 92, a second output body 94 and the second transmission body 96.

The rotation of the first output body 88 is input to the second input body 92. The second input body 92 includes a sun gear 92A that is coupled to the first output body 88. The sun gear 92A is arranged on the outer circumferential portion of the first output body 88, and rotated integrally with the first output body 88. Preferably, the number of teeth of the sun gear 92A of the second input body 92 is equal to the number of teeth of the sun gear 86A of the first input body 86.

The second output body 94 includes a plurality of planetary gears 94A and a carrier 94B. The planetary gears 94A are engaged with the second input body 92. The carrier 94B rotationally supports the planetary gears 94A. Preferably, the second planetary gear mechanism 74A includes the planetary gears 94A. The carrier 94B rotationally supports each of the planetary gears 94A with a planetary pin 94C that extends through the planetary gear 94A in the axial direction. In a further example, the planetary pins 94C can be rotated integrally with the corresponding one of the planetary gears 94A and rotationally supported by the carrier 94B.

Preferably, the number of teeth of each planetary gear 94A of the second output body 94 is equal to the number of teeth of each planetary gear 88A of the first output body 88. A gear 94D is arranged on the outer circumferential portion of the carrier 94B of the second output body 94. The gear 94D is coaxial with the second output body 94. Further, the gear 94D is engaged with the gear 84 on the outer circumferential portion of the resultant force member 70. This configuration allows the second output body 94 to transmit rotation to the resultant force member 70. The gear 94D and the gear 84 form a speed reduction mechanism. Preferably, the rotation of the second output body 94 is reduced in speed when transmitted to the resultant force member 70. A further gear can be arranged between the gear 94D and the gear 84 to transmit rotation from the second output body 94 to the resultant force member 70. Alternatively, an annular member can be used to transmit rotation from the second output body 94 to the resultant force member 70. An example of an annular member is a belt running around the second output body 94 and the resultant force member 70. When the rotation direction of the second output body 94 is the same as the rotation direction of the resultant force member 70 because of a gear arranged between the gear 94D and the gear 84 or because of an annular member transmitting rotation from the second output body 94 to the resultant force member 70, the driving direction of the first motor 66 and the second motor 68 and the direction in which the first one-way clutch 78 and the second one-way clutch 80 are arranged can be reversed. The resultant force member 70 combines the torque of the first motor 66 and the torque applied to the crankshaft 42. The rotation of the first motor 66 is changed in speed by the first planetary gear mechanism 64 and then transmitted to the resultant force member 70. The rotation produced by the crankshaft 42 is transmitted to the resultant force member 70 without being changed in speed.

The second transmission body 96 functions to transmit the rotation of the second input body 92 to the second output body 94. The second transmission body 96 includes a ring gear 96A engaged with the second output body 94. Preferably, the number of teeth of the ring gear 96A of the second transmission body 96 is equal to the number of teeth of the ring gear 90A of the first transmission body 90. The first transmission body 90 and the second transmission body 96 are integrated with each other to rotate in synchronism. Thus, the second transmission body 96 is rotatable in the first direction relative to the housing 72, and is non-rotatable in the second direction relative to the housing 72. The first transmission body 90 and the second transmission body 96 can be formed integrally with each other or be separate bodies that are coupled and integrated with each other.

The first motor 66 is supported by the housing 72. The first motor 66 is configured to rotate the first input body 86. The first motor 66 includes a main body 66A and the output shaft 66B. The main body 66A includes a rotor and a stator (neither shown). The output shaft 66B transmits the rotation of the rotor of the first motor 66 to the first input body 86. The first motor 66 is coaxial with the first planetary gear mechanism 64. The first motor 66 and the first speed reduction mechanism 74 are located at opposite sides of the first planetary gear mechanism 64 in the axial direction of the first planetary gear mechanism 64.

The second motor 68 is configured to rotate the first transmission body 90. The second motor 68 is supported by the housing 72. The second motor 68 includes a main body 68A and an output shaft 68B. The main body 68A includes a rotor and a stator (neither shown). The second motor 68 is located at the radially outer side of the first motor 66. The axis of the second motor 68 is parallel to the axis of the first motor 66. A gear 68C is arranged on the output shaft 68B of the second motor 68. The rotation produced by the second motor 68 is transmitted via the second speed reduction mechanism 76 to the first transmission body 90. The gear 68C can be connected by a one-way clutch to the output shaft 68B to restrict the transmission of human power that rotates the crankshaft 42 forward to the output shaft 68B of the second motor 68.

The second speed reduction mechanism 76 reduces the speed of the rotation produced by the second motor 68 and transmits the rotation to the first transmission body 90. The second speed reduction mechanism 76 includes the gear 68C on the output shaft 68B of the second motor 68, a support 98 including a gear 98A, and a gear 90B on the outer circumferential portion of the first transmission body 90. The gear 98A is coaxial with the support 98 and rotated integrally with the support 98. The support 98 is a shaft that is rotationally supported by the housing 72. The support 98 can be fixed to the housing 72 and rotationally support the gear 98A. The gear 98A is engaged with the gear 90B. The gear 90B is coaxial with the first transmission body 90. The gear 98A has more teeth than the gear 68C. The gear 90B has more teeth than the gear 98A. The gear 98A can be omitted from the second speed reduction mechanism 76, and the gear 68C can be engaged with the gear 90B. In this case, the driving direction of the second motor 68 is reversed. There is no limit to the number of gears included in the second speed reduction mechanism 76.

Referring to FIG. 2, the drive unit 60 further includes a torque sensor 100 and a rotational speed sensor 102. The torque sensor 100 is, for example, a strain gauge, a semiconductor strain gauge, or a magnetostrictive sensor. The torque sensor 100 is coupled to the hollow shaft 82 of the resultant force member 70. When using a magnetostrictive sensor, a magnetostrictive element is coupled to the hollow shaft 82. The torque sensor 100 detects the torque applied to the resultant force member 70.

When the rotation of the crankshaft 42 is transmitted to the resultant force member 70 and the rotation produced by the first motor 66 and the rotation produced by the second motor 68 are not transmitted to the resultant force member 70, the torque sensor 100 provides the controller 110 with a signal reflecting the human power input to the crankshaft 42. When the rotation of the crankshaft 42, the rotation produced by the first motor 66, and the rotation produced by the second motor 68 are transmitted to the resultant force member 70, the torque sensor 100 provides the controller 110 with a signal reflecting the torque obtained by combining the human power input to the crankshaft 42 with the torque of the first motor 66 and the torque of the second motor 68 transmitted via the first planetary gear mechanism 64 and the first speed reduction mechanism 74.

The rotational speed sensor 102 includes a cadence sensor that detects the rotational speed of the crank 38. The cadence sensor detects, for example, a magnet arranged on the crankshaft 42. The cadence sensor can be a magnetic detection sensor such as a reed switch or a Hall Effect element. The cadence sensor provides the controller 110 with a signal corresponding to the rotational speed of the crankshaft 42. The cadence sensor can be configured to detect a magnet arranged on a crank arm 44. In this case, the cadence sensor provides the controller 110 with a signal corresponding to the rotational speed of the crankshaft 42. The rotational speed sensor can further include a speed sensor that detects the rotational speed of the front wheel or rear wheel of the bicycle 10. The controller 110 calculates a crank rotational speed CA from the detection result of the rotational speed sensor.

The controller 110 includes an electronic control unit 112 (ECU). Preferably, the controller 110 further includes a memory 114. The memory 114 stores various control programs and information used for various control processes. The electronic control unit 112 includes a computer that executes control programs set in advance. The computer can be, for example, a central processing unit (CPU) or a micro-processing unit (MPU) having at least one processor.

The electronic control unit 112 controls the first motor 66 and the second motor 68. The electronic control unit 112 controls the rotation produced by the first motor 66 and the rotation produced by the second motor 68 in accordance with the human power and the crank rotational speed CA. The electronic control unit 112 controls the first motor 66 to produce rotation to rotate the first input body 86 in the first direction. When the first input body 86 rotates in the first direction, rotation that moves the bicycle 10 forward is transmitted to the resultant force member 70. When the first transmission body 90 does not rotate relative to the housing 72, the rotation of the first input body 86 is reduced in speed and output from the first output body 88 to the second input body 92. Thus, the transmission ratio rX of the first planetary gear mechanism 64 is smaller than "1."

The electronic control unit 112 controls the second motor 68 to produce rotation to rotate the first transmission body 90 in the first direction. As the rotational speed of the first transmission body 90 in the first direction increases, the transmission ratio rX of the first planetary gear mechanism 64 increases. When the rotational speed of the first transmission body 90 in the first direction becomes equal to the rotational speed of the first input body 86, the transmission ratio rX of the first planetary gear mechanism 64 is "1." More specifically, the electronic control unit 112 controls the rotational speed of the second motor 68 to continuously change the speed ratio rX. The control of the second motor 68 allows the transmission ratio rX to be changed from a value smaller than "1" to the value of "1." The electronic control unit 112 controls the rotational speed of the second motor 68 in multiple steps and changes the transmission ratio rX in multiple steps.

The relationship of the transmission ratio rY of the second motor 68 and the first speed reduction mechanism 74 will now be described.

When the second transmission body 96 is not rotated relative to the housing 72, the rotation of the second input body 92 is reduced in speed and output from the first output body 88. Thus, the transmission ratio rY of the second planetary gear mechanism 74A is smaller than "1." The transmission ratio rY is the rotational speed of the second output body 94 relative to the rotational speed of the input body 92.

The electronic control unit 112 controls the second motor 68 to produce rotation to rotate the second transmission body 96 in the first direction. As the rotational speed of the second transmission body 96 in the first direction increases, the transmission ratio rY of the second planetary gear mechanism 74A increases. When the rotational speed of the second transmission body 96 in the first direction becomes equal to the rotational speed of the second input body 92, the transmission ratio rY of the second planetary gear mechanism 74A is "1." More specifically, the electronic control unit 112 controls the rotational speed of the second motor 68 to continuously change the speed ratio rY. The control of the second motor 68 allows the transmission ratio rY to be changed from a value smaller than "1" to the value of "1."

The first transmission body 90 and the second transmission body 96 rotate integrally with each other. Thus, the transmission ratio rX of the first planetary gear mechanism 64 and the transmission ratio rY of the first speed reduction mechanism 74 are correlated with each other. As the speed ratio rX of the first planetary gear mechanism 64 increases, the transmission ratio rY of the first speed reduction mechanism 74 increases. The transmission ratio r2 of the second transmission 54 is equal to the product of the transmission ratio rX and the transmission ratio rY.

The electronic control unit 112 switches between an automatic gear change mode, in which the shift stage of the first transmission 52 is changed in accordance with the crank rotational speed CA, and a manual gear change mode, in which the shift stage of the first transmission 52 is changed solely by the operation of the operation unit 58. For example, a rider operates the operation unit 58 (refer to FIG. 1) to switch the electronic control unit 112 between an automatic gear change mode and a manual gear change mode. Preferably, in the automatic gear change mode, the crank rotational speed CA is maintained in a predetermined range.

In the automatic gear change mode, the electronic control unit 112 controls the first transmission 52 in accordance with the condition of the bicycle 10. The condition of the bicycle 10 includes the crank rotational speed CA. The electronic control unit 112 controls the first transmission 52 to maintain the crank rotational speed CA within a predetermined range from lower than or equal to an upper limit value CAA to higher than or equal to a lower limit value CAB. The electronic control unit 112 controls the shift stage of the second transmission 54 in accordance with the crank rotational speed CA and a first predetermined rotational speed CAX. Further, the electronic control unit 112 controls the shift stage of the second transmission 54 in accordance with the crank rotational speed CA and a second predetermined rotational speed CAY. The upper limit value CAA is higher than the first predetermined rotational speed CAX. The lower limit value CAB is lower than the second predetermined rotational speed CAY. The first predetermined rotational speed CAX is higher than the second predetermined rotational speed CAY.

In the automatic gear change mode and the manual gear change mode, the electronic control unit 112 controls the second transmission 54 in accordance with a shift instruction to the first transmission 52 and the condition of the bicycle 10. In the automatic gear change mode, the electronic control unit 112 controls the second transmission 54 in accordance with the condition of the first transmission 52 and the condition of the bicycle 10. The condition of the first transmission 52 includes the transmission ratio r1 of the bicycle 10.

Figure 5:
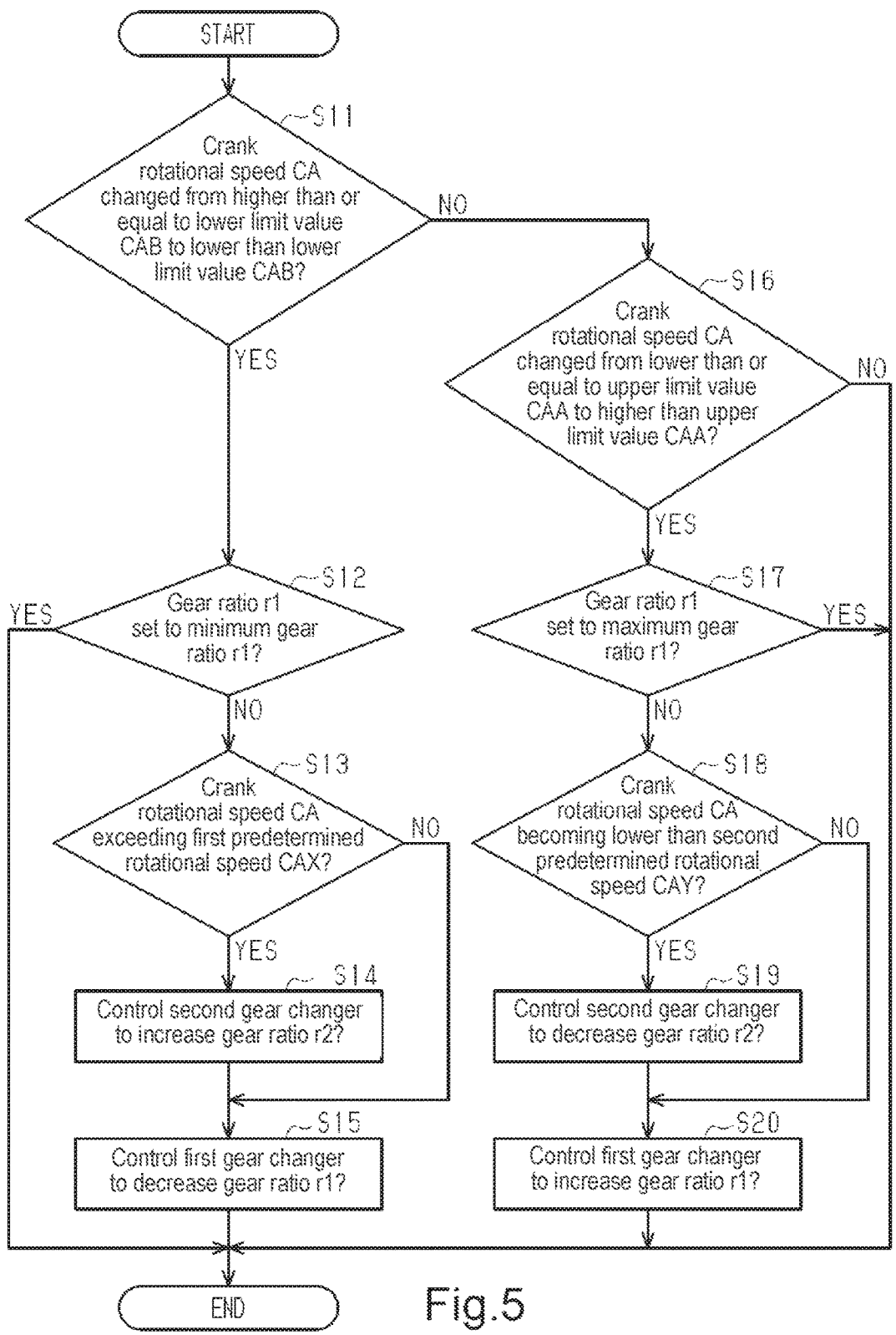
FIG. 5 is a flowchart of a first gear change process of the bicycle transmission system in accordance with the first embodiment.

With reference to FIG. 5, a first gear change process executed in the automatic gear change mode will now be described. The present process is repeated in predetermined cycles when the automatic gear change mode is set.

In step S11, the electronic control unit 112 determines whether or not the crank rotational speed CA has changed from a value higher than or equal to the lower limit value CAB to a value lower than the lower limit value CAB. When the crank rotational speed CA has changed from a value equal to the lower limit value CAB or higher to a value lower than the lower limit value CAB, the electronic control unit 112 proceeds to step S12. In step S12, the electronic control unit 112 determines whether or not the transmission ratio r1 of the bicycle is set to the minimum transmission ratio r1. When determining that the transmission ratio r1 of the bicycle is not set to the minimum transmission ratio r1, the electronic control unit 112 proceeds to step S13. Here, the transmission ratio r2 of the second transmission 54 can be changed between two stages.

Figure 6:
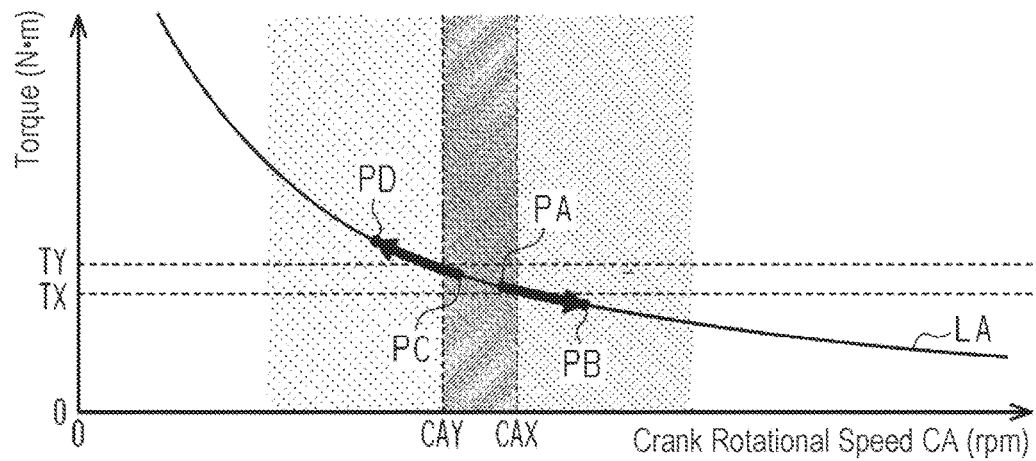
FIG. 6 is a graph showing the relationship of the crank rotational speed and the torque.

In step S13, the electronic control unit 112 determines whether or not the crank rotational speed CA will exceed the first predetermined rotational speed CAX by controlling the first transmission 52 to decrease the transmission ratio r1 of the first transmission 52. The electronic control unit 112 is configured to predict from the condition of the first transmission 52 and the crank rotational speed CA whether or not the crank rotational speed CA will change to a value exceeding the first predetermined rotational speed CAX by operating the first transmission 52. The determination of whether or not the crank rotational speed CA will change to a value that exceeds the first predetermined rotational speed CAX is based on the present crank rotational speed CA, the present transmission ratio r1 of the bicycle, and the transmission ratio r1 of the bicycle after the shift stage is changed. The transmission ratio r1 of the bicycle is set in advance for each shift stage and stored in the memory 114. Thus, the crank rotational speed CA after the shift stage is changed can be predicted. FIG. 6 is a graph showing the correlation of the crank rotational speed CA and the human power torque. It is generally known that an increase in the crank rotational speed CD reduces the human power torque.

When the operation of the first transmission 52 will cause the crank rotational speed CA to exceed the first predetermined rotational speed CAX, the electronic control unit 112 operates the second transmission 54 and the first transmission 52 in a predetermined order. When the operation of the first transmission 52 will cause the crank rotational speed CA to exceed the first predetermined rotational speed CAX, in step S14, the electronic control unit 112 first controls the second transmission 54 to increase the transmission ratio r2 of the second transmission 54. In step S14, the transmission ratio r2 remains unchanged when the transmission ratio r2 of the second transmission 54 is set to the one of the two stages having the higher transmission ratio r2. In step S15, the electronic control unit 112 controls the first transmission 52 to decrease the transmission ratio r1 of the bicycle. In step S15, the electronic control unit 112 changes the shift stage of the first transmission 52 by only one step. Upon completion of step S15, the electronic control unit 112 ends the present routine. When determining in step S12 that the transmission ratio r1 of the bicycle is set to the minimum transmission ratio r1, the electronic control unit 112 ends the present routine.

When determining in step S13 that the operation of the first transmission 52 will not cause the crank rotational speed CA to exceed the first predetermined rotational speed CAX, the electronic control unit 112 proceeds to step S15.

When determining in step S11 that the crank rotational speed CA has not changed from a value higher than or equal to the lower limit value CAB to a value lower than the lower limit value CAB, the electronic control unit 112 proceeds to step S16. In step S16, the electronic control unit 112 determines whether or not the crank rotational speed CA has changed from a value lower than or equal to the upper limit value CAA to a value higher than the upper limit value CAA. When determining that the crank rotational speed CA has changed from a value lower than or equal to the upper limit value CAA to a value higher than the upper limit value CAA, the electronic control unit 112 proceeds to step S17. In step S17, the electronic control unit 112 determines whether or not the transmission ratio r1 of the bicycle is set to the maximum transmission ratio r1. When determining that the transmission ratio r1 of the bicycle is not set to the maximum transmission ratio r1, the electronic control unit 112 proceeds to step S18.

In step S18, the electronic control unit 112 determines whether or not the crank rotational speed CA will become lower than the second predetermined rotational speed CAY by controlling the first transmission 52 to increase the transmission ratio r1 of the first transmission 52. The electronic control unit 112 is configured to predict from the condition of the first transmission 52 and the crank rotational speed CA whether or not the crank rotational speed CA will change to a value lower than the second predetermined rotational speed CAY by operating the first transmission 52. The determination of whether or not the crank rotational speed CA will change to a value that is lower than the second predetermined rotational speed CAY is based on the present crank rotational speed CA, the present transmission ratio r1 of the bicycle, and the transmission ratio r1 of the bicycle after the shift stage is changed.

When the operation of the first transmission 52 will cause the crank rotational speed CA to become lower than the second predetermined rotational speed CAY, the electronic control unit 112 operates the second transmission 54 and the first transmission 52 in a predetermined order. When the operation of the first transmission 52 will cause the crank rotational speed CA to become lower than the second predetermined rotational speed CAY, in step S19, the electronic control unit 112 controls the second transmission 54 to decrease the transmission ratio r2 of the second transmission 54. In step S19, the transmission ratio r2 remains unchanged when the transmission ratio r2 of the second transmission 54 is set to the one of the two stages having the lower transmission ratio r2. Then, in step S20, the electronic control unit 112 controls the first transmission 52 to increase the transmission ratio r1 of the bicycle. In step S20, the electronic control unit 112 changes the shift stage of the first transmission 52 by only one step. Upon completion of step S20, the electronic control unit 112 ends the present routine. When determining in step S17 that the transmission ratio r1 of the bicycle is set to the maximum transmission ratio r1, the electronic control unit 112 ends the present routine.

When determining in step S18 that the operation of the first transmission 52 will not cause the crank rotational speed CA to become lower than the second predetermined rotational speed CAY, the electronic control unit 112 proceeds to step S20.

When determining in step S16 that the crank rotational speed CA has not changed from a value lower than or equal to the upper limit value CAA to a value higher than the upper limit value CAA, the electronic control unit 112 ends the present routine without changing the shift stages of the first transmission 52 and the second transmission 54. When the crank rotational speed CA is within a predetermined range from the upper limit value CAA or lower to the lower limit value CAB or higher, the electronic control unit 112 does not execute control for changing the shift stage of the first transmission 52 and the second transmission 54 based on the state of the bicycle 10.

Figure 7:
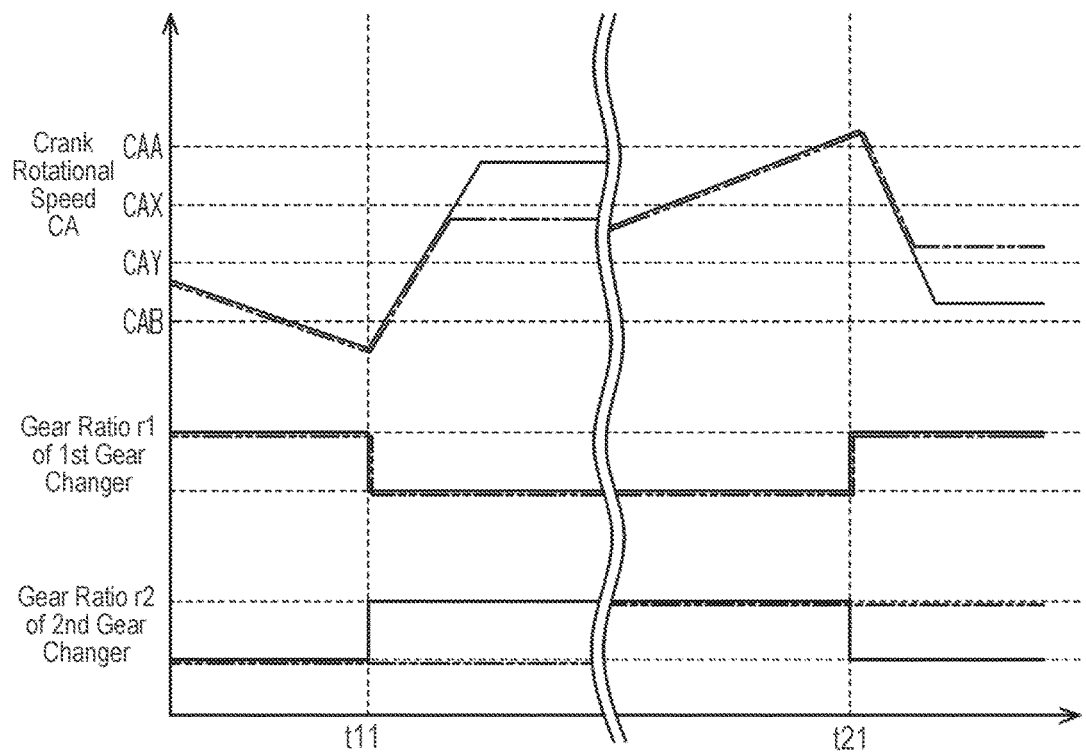
FIG. 7 is a timing chart showing one example of the execution of a first gear change process.

One example of a first gear change process executed by the electronic control unit 112 will now be described with reference to FIG. 7.

At time t11, the crank rotational speed CA changes from a value higher than or equal to the lower limit value CAB to a value lower than the lower limit value CAB. The solid lines in FIG. 7 indicate a case in which it is predicted at time t11 that the crank rotational speed CA will subsequently change to a speed exceeding the first predetermined rotational speed CAX when the electronic control unit 112 controls the first transmission 52 to decrease the transmission ratio r1 of the first transmission 52. In this case, the electronic control unit 112 controls the second transmission 54 to increase the transmission ratio r2 of the second transmission 54 and controls the first transmission 52 to decrease the transmission ratio r1 of the first transmission 52.

The double-dashed lines in FIG. 7 indicate a case in which it is predicted at time t11 that the crank rotational speed CA will subsequently not exceed the first predetermined rotational speed CAX when the electronic control unit 112 controls the first transmission 52 to decrease the transmission ratio r1 of the first transmission 52. In this case, the electronic control unit 112 controls the first transmission 52 to decrease the transmission ratio r1 of the first transmission 52 without changing the transmission ratio r2 of the second transmission 54.

At time t21, the crank rotational speed CA changes from a value lower than or equal to the upper limit value CAA to a value exceeding the upper limit value. The solid lines in FIG. 7 indicate a case in which it is predicted at time t21 that the crank rotational speed CA will subsequently become lower than the second predetermined rotational speed CAY when the electronic control unit 112 controls the first transmission 52 to increase the transmission ratio r1 of the first transmission 52. In this case, the electronic control unit 112 controls the second transmission 54 to decrease the transmission ratio r2 of the second transmission 54 and controls the first transmission 52 to increase the transmission ratio r1 of the first transmission 52.

The double-dashed line in FIG. 7 indicates a case in which it is predicted at time t21 that the crank rotational speed CA will subsequently not become lower than the first predetermined rotational speed CAX when the electronic control unit 112 controls the first transmission 52 to decrease the transmission ratio r1 of the first transmission 52. In this case, the electronic control unit 112 controls the first transmission 52 to increase the transmission ratio r1 of the first transmission 52 without changing the transmission ratio r2 of the second transmission 54.

Figure 8:
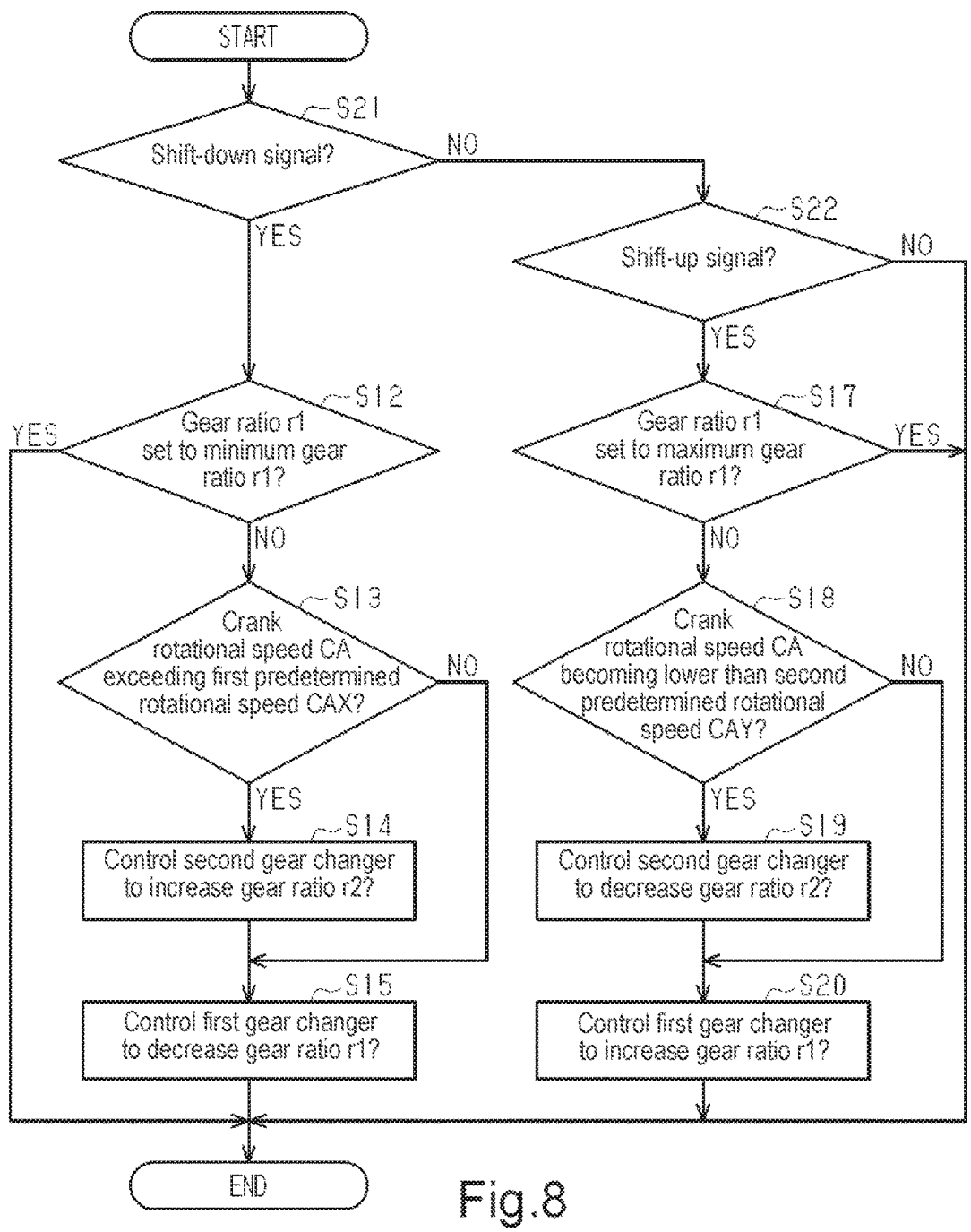
FIG. 8 is a flowchart of a second gear change process in accordance with the first embodiment.

A second gear change process executed in an automatic gear change mode and a manual gear change mode will now be described with reference to FIG. 8. The present process is executed in predetermined cycles as long as the transmission system 50 is supplied with power.

In step S21, the electronic control unit 112 determines whether or not a shift-down signal has been received from the operation unit 58. When a shift-down signal has been received, the electronic control unit 112 executes steps S12 to S15 of the first gear change process and ends the present routine. In the present routine, the electronic control unit 112 is configured to predict, from the crank rotational speed CA and a shift instruction to the first transmission 52, whether or not the operation of the first transmission 52 will change the crank rotational speed CA to a value exceeding the first predetermined rotational speed CAX.

When a shift-down signal is not received in step S21, the electronic control unit 112 proceeds to step S22 and determines whether or not a shift-up signal has been received. When a shift-up signal has been received, the electronic control unit 112 executes steps S17 to S20 of the first gear change process and then ends the present routine. In the present routine, the electronic control unit 112 is configured to predict, from the crank rotational speed CA and a shift instruction to the first transmission 52, whether or not the crank rotational speed CA will change to a value lower than the second predetermined rotational speed CAY. When a shift-up signal has not been received in step S22, the electronic control unit 112 ends the present routine without operating the first transmission 52 and the second transmission 54.

The advantages of the transmission system 50 in the present embodiment will now be described.

The second transmission 54 of the transmission system 50 is configured to transmit a rotation force from the motor 56 to the power transmission path extending from the crank 38 to the rear wheel 14 without changing the ratio of the rotation of the rear wheel 14 to the rotation of the crank 38 in any shift stage of the first transmission 52. This configuration allows the rotational speed of the first motor 66 to be maintained in a predetermined range and limits decreases in the assist force that would occur when the crank rotational speed CA changes.

(2) The electronic control unit 112 controls the second transmission 54 based on the crank rotational speed CA and the condition of the first transmission 52 or a shift instruction to the first transmission 52. This limits decreases in the assist force when a change in the shift stage of the first transmission 52 changes the crank rotational speed CA.

(3) When the operation of the first transmission 52 will result in the crank rotational speed CA exceeding the first predetermined rotational speed CAX, the electronic control unit 112 controls the second transmission 54 to increase the transmission ratio r2 of the second transmission 54. More specifically, when predicting that the crank rotational speed CA will not be suitable for the transmission ratio r2 of the second transmission 54, the transmission ratio r2 of the second transmission 54 is changed in advance to a transmission ratio r2 that is suitable for the crank rotational speed CA after the first transmission 52 is operated.

(4) When the operation of the first transmission 52 will result in the crank rotational speed CA being lower than the second predetermined rotational speed CAY, the electronic control unit 112 controls the second transmission 54 to decrease the transmission ratio r2 of the second transmission 54. More specifically, when predicting that the crank rotational speed CA will not be suitable for the transmission ratio r2 of the second transmission 54, the transmission ratio r2 of the second transmission 54 is changed in advance to a transmission ratio r2 that is suitable for the crank rotational speed CA after the first transmission 52 is operated.

(5) The electronic control unit 112 controls the first transmission 52 in the automatic gear change mode to maintain the crank rotational speed CA in the predetermined range from lower than or equal to the upper limit value CAA to higher than or equal to the lower limit value. This limits changes in the crank rotational speed CA when a rider is riding the bicycle and reduces the load on the rider.

(6) The electronic control unit 112 controls the rotational speed of the second motor 68 to change the transmission ratio r2 of the second transmission 54 in steps. This obtains the transmission ratio r2 of the second transmission 54 that is optimal for the crank rotational speed CA.

Second Embodiment

A second embodiment of the transmission system 50 will now be described with reference to FIGS. 2, 6, 9, and 10. Same reference characters are given to those components that are the same as the corresponding components of the first embodiment. Such components will not be described in detail.

The electronic control unit 112 shown in FIG. 2 executes a third gear change process that changes the transmission ratio r2 of the second transmission 54 based on the condition of the bicycle 10. The condition of the bicycle 10 includes torque T that is produced by human power. The third gear change process differs from the first gear change process in that step S11 is replaced by step S41, step S13 is replaced by step S42, step S16 is replaced by step S43, and step S18 is replaced by step S44. The remaining steps are the same as the first gear change process and will not be described in detail.

Figure 9:
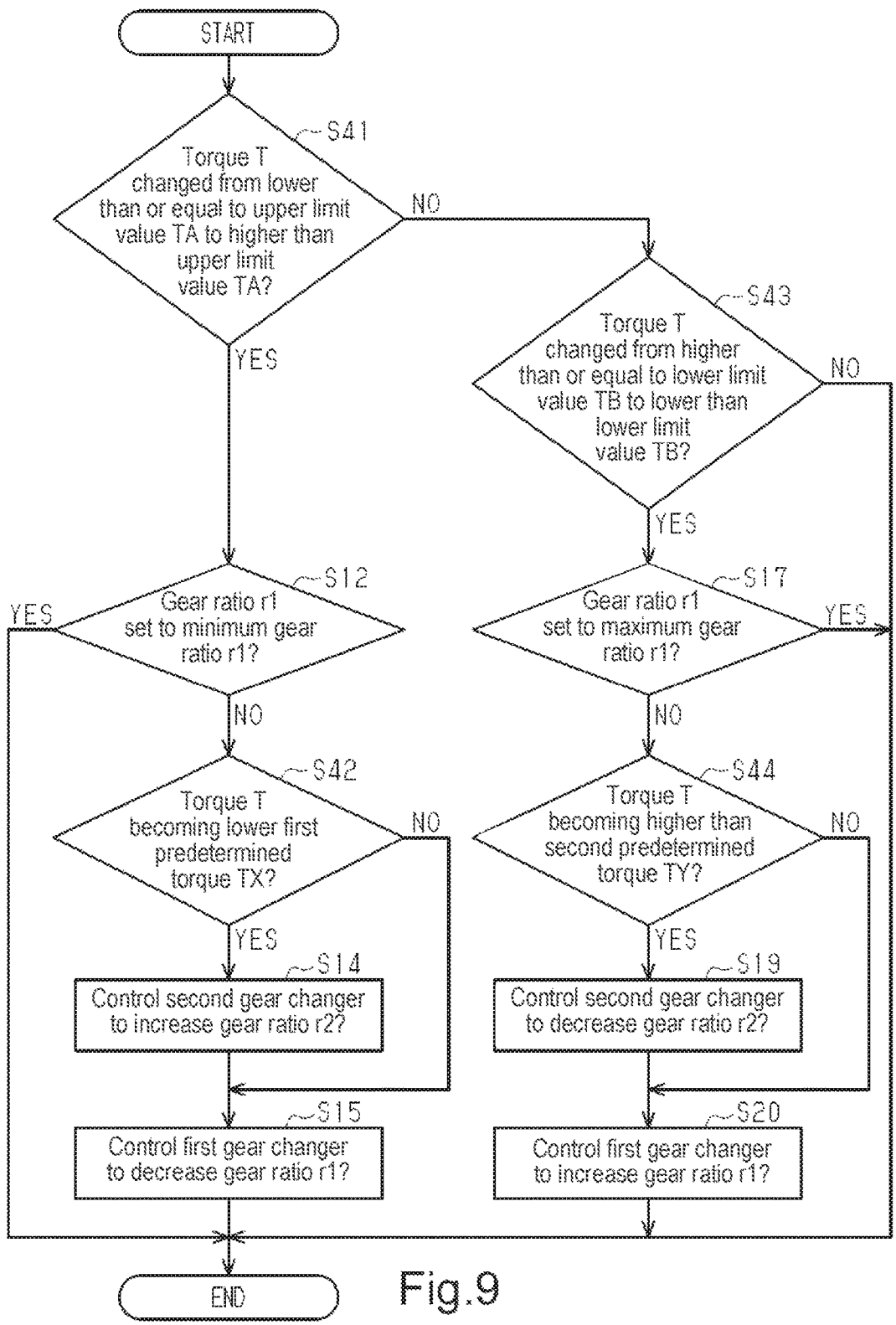
FIG. 9 is a flowchart of a third gear change process in accordance with a second embodiment.

Referring to FIG. 9, the third gear change process executed by the electronic control unit 112 will now be described. The process is executed in predetermined cycles as long as the automatic gear change mode is being executed.

In step S41, the electronic control unit 112 determines whether or not the torque T produced by human power has changed from a value lower than or equal to the upper limit value TA to a value higher than the upper limit value TA. When determining that the torque T has changed from a value lower than or equal to the upper limit value TA to a value higher than the upper limit value TA, the electronic control unit 112 proceeds to step S12. In step S12, when the electronic control unit 112 determines that the transmission ratio r1 of the bicycle is not set to the minimum transmission ratio r1, the electronic control unit 112 proceeds to step S42.

In step S42, the electronic control unit 112 determines whether or not the torque T will become lower than a first torque TX (i.e., first predetermined torque) when controlling the first transmission 52 to decrease the transmission ratio r1 of the first transmission 52. The electronic control unit 112 is configured to predict whether or not the torque T will change to a value lower than the first predetermined torque TX by operating the first transmission 52. The electronic control unit 112 determines whether or not the torque T will change to a value lower than the first predetermined torque TX from, for example, the transmission ratio r1 of the bicycle in each shift stage and information related to the correlation of the torque T and the crank rotational speed CA (for example, curve of FIG. 6). The present crank rotational speed CA is estimated from the present torque T. An estimated value of the crank rotational speed CA subsequent to gear changing is obtained from the estimated value of the crank rotational speed CA, the present transmission ratio r1 of the bicycle, and the transmission ratio r1 of the bicycle subsequent to gear changing. The torque T subsequent to gear changing can be estimated from the estimated value of the crank rotational speed CA subsequent to gear changing and the correlation of the torque T and the crank rotational speed CA. The information related with the correlation of the torque T and the crank rotational speed CA is stored in the memory 114 as, for example, a numerical expression. The electronic control unit 112 can estimate the crank rotational speed CA without using the rotational speed sensor 102 by measuring the torque T with the torque sensor 100.

When the torque T will become lower than the first predetermined torque TX by operating the first transmission 52, in step S14, the electronic control unit 112 controls the second transmission 54 to increase the transmission ratio r2 of the second transmission 54. The torque T changes even during a single rotation of the crank. Thus, the electronic control unit 112 calculates, for example, the average torque of a single crank rotation or the average torque of multiple crank rotations and uses the average torque as the present torque. The electronic control unit 112 operates the first transmission 52 so that the torque T does not become lower than the first predetermined torque TX and then proceeds to step S15.

When determining in step S41 that the torque T has not changed from a value lower than or equal to the upper limit value TA to a value higher than the upper limit value TA, the electronic control unit 112 proceeds to step S43 and determines whether or not the torque T has changed from a value higher than or equal to the lower limit value TB to a value lower than the lower limit value TB. When determining that the torque T has changed from a value higher than or equal to the lower limit value TB to a value lower than the lower limit value TB, the electronic control unit 112 proceeds to step S44.

In step S44, the electronic control unit 112 determines whether or not the torque T will become higher than a second torque TY (i.e., second predetermined torque) by controlling the first transmission 52 to increase the transmission ratio r1 of the first transmission 52. The electronic control unit 112 is configured to predict from the condition of the first transmission 52 and the torque T whether or not the torque T will change to a value exceeding the second torque TY by operating the first transmission 52. The determination of whether the torque T will change to a value that is higher than the second torque TY is performed in the same manner as in step S42.

When the operation of the first transmission 52 will cause the torque T to exceed the second torque TY, in step S19, the electronic control unit 112 controls the second transmission 54 to decrease the transmission ratio r2 of the second transmission 54. When the torque T will not become higher than the second torque TY by operating the first transmission 52 in step S44, the electronic control unit 112 proceeds to step S20.

When determining in step S43 that the torque T has not changed from a value higher than or equal to the lower limit value TB to a value lower than the lower limit value TB, the electronic control unit 112 ends the present routine without changing the shift stages of the first transmission 52 and the second transmission 54.

Figure 10:
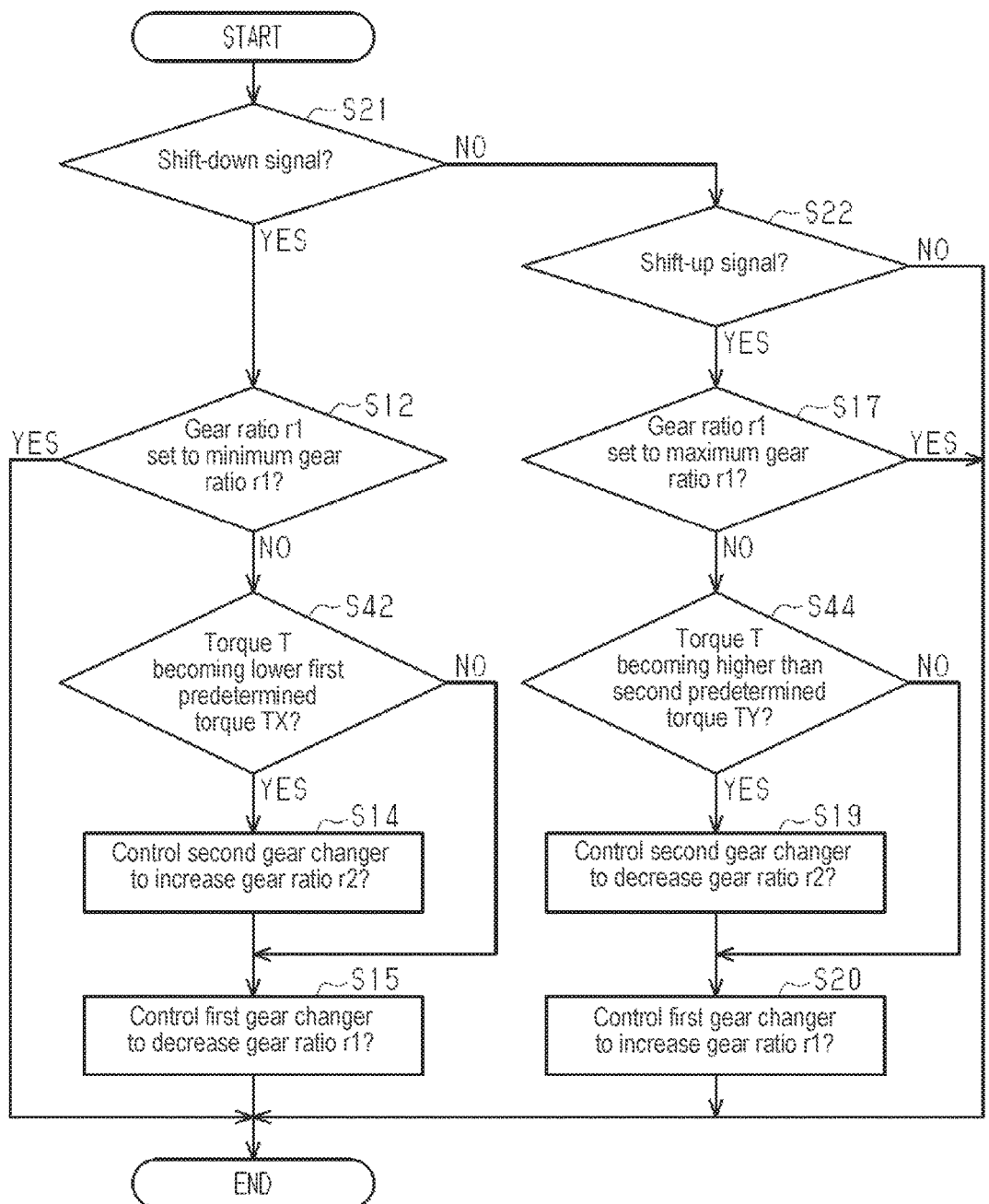
FIG. 10 is a flowchart of a fourth gear change process in accordance with the second embodiment.

Referring to FIG. 10, a fourth gear change process executed during the automatic gear change mode and the manual gear change mode will now be described. The process is executed in predetermined cycles as long as the transmission system 50 is supplied with power. The fourth gear change process differs from the third gear change process in that step S41 is replaced by step S21 and step S43 is replaced by step S22. The remaining steps are the same as the third gear change process and will not be described in detail.

In step S21, the electronic control unit 112 determines whether or not a shift-down signal has been received from the operation unit 58. When a shift-down signal has been received, the electronic control unit 112 proceeds to step S42 of the third gear process. In the present routine, the electronic control unit 112 is configured to predict, from the torque T and a shift instruction to the first transmission 52, whether or not the operation of the first transmission 52 will change the torque T to a value lower than the first torque TX.

When a shift-down signal is not received in step S21, the electronic control unit 112 proceeds to step S22 and determines whether or not a shift-up signal has been received. When a shift-up signal has been received, the electronic control unit 112 proceeds to step S44. In the present routine, the electronic control unit 112 is configured to predict, from the torque T and the condition of the first transmission 52, whether or not the torque T will change to a value exceeding the second torque TY. When a shift-up signal has not been received in step S21, the electronic control unit 112 ends the present routine.

The second embodiment of the transmission system 50 has the advantages described below in addition to advantage (1) and (6) of the first embodiment.

(7) The electronic control unit 112 controls the first transmission 52 based on the torque T and the condition of the first transmission 52 or a shift instruction to the first transmission 52. This limits decreases in the assist force that would occur when a change in the shift stage of the first transmission 52 changes the torque T.

(8) When the torque T will become lower than the first predetermined torque TX by operating the first transmission 52, the second transmission 54 is controlled to increase the transmission ratio r of the second transmission 54. More specifically, when the electronic control unit 112 is configured to predict that the torque T will become unsuitable for the transmission ratio r2 of the second transmission 54, the transmission ratio r2 of the second transmission 54 can be changed in advance to a transmission ratio r2 that is optimal for the torque T subsequent to the operation of the first transmission 52.

(9) When the torque T will become higher than the second predetermined torque by operating the first transmission 52, the electronic control unit 112 controls the second transmission 54 to decrease the transmission ratio r2 of the second transmission 54. More specifically, when the electronic control unit 112 is configured to predict that the torque T will become unsuitable for the transmission ratio r2 of the second transmission 54, the transmission ratio r2 of the second transmission 54 can be changed in advance to a transmission ratio r2 that is optimal for the torque T subsequent to the operation of the first transmission 52.

(10) The electronic control unit 112 controls the first transmission 52 so that the torque T in the automatic gear change mode is maintained in the predetermined range from lower than or equal to the upper limit value TA to higher than or equal to the lower limit value TB. This limits changes in the torque T when a rider is riding the bicycle and reduces the load on the rider.

Third Embodiment

A third embodiment of the transmission system 50 will now be described with reference to FIGS. 2 and 11. Same reference characters are given to those components that are the same as the corresponding components of the first embodiment. Such components will not be described in detail.

The electronic control unit 112 shown in FIG. 2 executes a fifth gear change process instead of or in addition to the second gear change process to change the transmission ratio r2 of the second transmission 54 based on the crank rotational speed CA. In the fifth gear change process, the electronic control unit 112 controls the second transmission 54 so that the transmission ratio r2 of the second transmission 54 increases when the crank rotational speed CA exceeds the first predetermined rotational speed CAX without operating the first transmission 52. When the crank rotational speed CA becomes lower than the second predetermined rotational speed CAY without operating the first transmission 52, the electronic control unit 112 controls the second transmission 54 so that the transmission ratio r2 of the second transmission 54 decreases.

Figure 11:
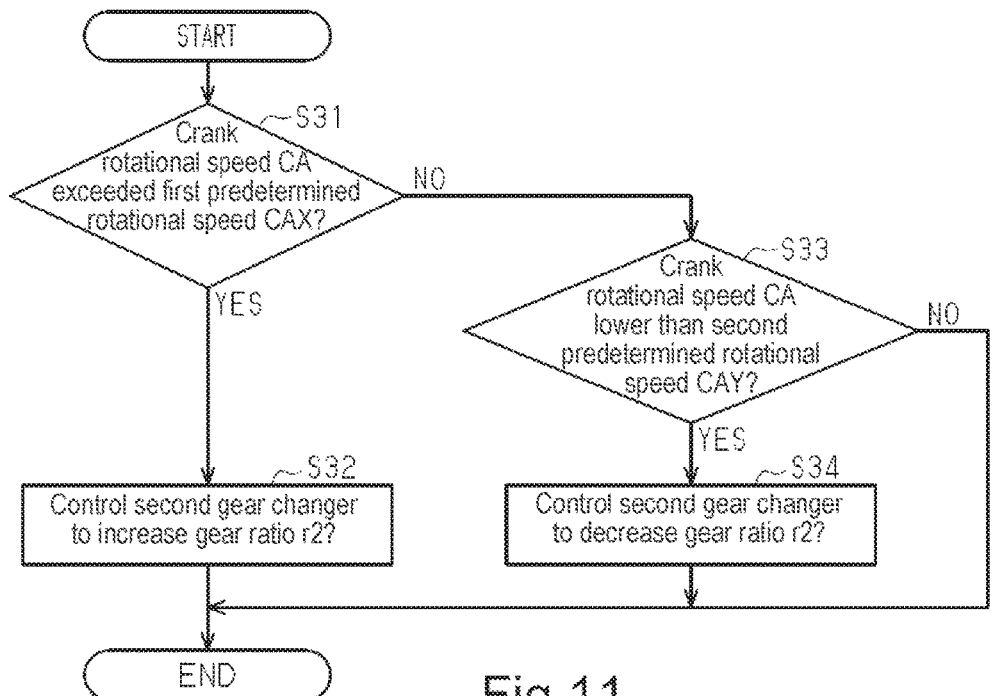
FIG. 11 is a flowchart of a fifth gear change process in accordance with a third embodiment.

Referring to FIG. 11, the fifth gear change process executed by the electronic control unit 112 will now be described. The present process is executed in predetermined cycles as long as the transmission system 50 is supplied with power.

In step S31, the electronic control unit 112 determines whether or not the crank rotational speed CA has exceeded the first predetermined rotational speed CAX. When the crank rotational speed CA exceeds the first predetermined rotational speed CAX, the electronic control unit 112 proceeds to step S32 and controls the second transmission 54 to increase the transmission ratio r2 of the second transmission 54. In step S32, when determining that the transmission ratio r2 of the second transmission 54 is the maximum transmission ratio r2 that can be obtained by the second transmission 54, the electronic control unit 112 maintains the transmission ratio r2.

When determining in step S31 that the crank rotational speed CA has not exceeded the first predetermined rotational speed CAX, the electronic control unit 112 proceeds to step S33 and determines whether or not the crank rotational speed CA has become lower than the second predetermined rotational speed CAY. When determining that the crank rotational speed CA has become lower than the second predetermined rotational speed CAY, the electronic control unit 112 proceeds to step S34 and controls the second transmission 54 to decrease the transmission ratio r2 of the second transmission 54. In step S34, when determining that the transmission ratio r2 of the second transmission 54 is the minimum transmission ratio r2 that can be obtained by the second transmission 54, the electronic control unit 112 maintains the transmission ratio r2.

When determining in step S33 that the crank rotational speed CA is greater than or equal to the second predetermined rotational speed CAY, that is, the crank rotational speed CA is lower than or equal to the first predetermined rotational speed CAX and higher than or equal to the second predetermined rotational speed CAY, the electronic control unit 112 ends the present routine without changing the transmission ratio r2 of the second transmission 54. In the present embodiment, the transmission system 50 obtains advantages (1) and (2) of the first embodiment.

Modified Examples

The present disclosure is not limited to the foregoing embodiments and various changes and modifications of its components can be made without departing from the scope of the present disclosure. Also, the components disclosed in the embodiments can be assembled in any combination for embodying the present disclosure. For example, some of the components can be omitted from all components disclosed in the embodiments. Further, components in different embodiments can be appropriately combined.

In the first to third embodiments, the first transmission 52 can include a front derailleur located near the crank 38 instead of the internal hub transmission. In this case, the gear change mechanism 52A includes a front derailleur and a plurality of front sprockets.

In the first and second gear change process of the first embodiment, the second transmission 54 can be controlled in accordance with the rotational speed of the motor 56 instead of the crank rotational speed CA. The rotational speed of the motor 56 is the condition of the bicycle 10. Preferably, the rotational speed of the motor 56 refers to the rotational speed of the first motor 66. In this case, when predicting that the rotational speed of the motor 56 will exceed the first predetermined rotational speed CAX by operating the first transmission 52 in step S13 of the first and second gear change processes, the second transmission 54 is controlled to increase the transmission ratio r2 of the second transmission 54 in step S14. Further, when predicting that the rotational speed of the motor 56 will become lower than the rotational speed of the motor 56 by operating the first transmission 52 in step S18 of the first and second gear processes, the electronic control unit 112 controls the second transmission 54 to decrease the transmission ratio r2 of the second transmission 54 in step S19.

In the first to fourth gear change processes of the first and second embodiments, step S14 can be executed after step S15. In such a case, after controlling the first transmission 52 to decrease the transmission ratio r1 of the first transmission 52, the electronic control unit 112 controls the second transmission 54 to increase the transmission ratio r2 of the second transmission 54. Further, step S14 and step S15 can be simultaneously executed. That is, the electronic control unit 112 can simultaneously operate the second transmission 54 and the first transmission 52. To perform such a process, when the electronic control unit 112 generates negative results in steps S13 and S42, only step S15 is performed, and step S14 is not performed.

In the first to fourth gear change processes of the first and second embodiments, step S19 can be executed after step S20. In such a case, after controlling the first transmission 52 to increase the transmission ratio r1 of the first transmission 52, the electronic control unit 112 controls the second transmission 54 to decrease the transmission ratio r2 of the second transmission 54. Further, steps S19 and S20 can be simultaneously executed. That is, the electronic control unit 112 can simultaneously operate the second transmission 54 and the first transmission 52. To perform such a process, when the electronic control unit 112 generates negative results in steps S18 and S44, only step S20 is performed, and step S19 is not performed.

Figure 12:
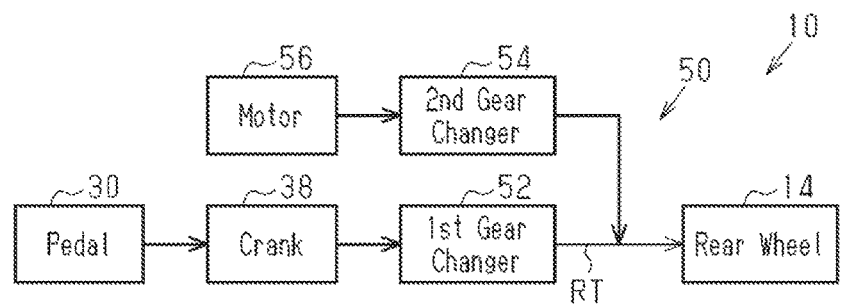
FIG. 12 is a schematic diagram of a bicycle power transmission path in accordance with a first modified example.

The structure of the transmission system 50 in each of the above embodiments can be modified, for example, as shown in FIG. 12. The first transmission 52 of the transmission system 50 in FIG. 12 includes a front transmission located near the crank 38. The second transmission 54 transmits rotation force from the motor 56 to the downstream side of the front transmission in the power transmission path RT. In this case, the first transmission 52 can be arranged in the drive unit 60. Further, the motor 56 and the second transmission 54 can be arranged in the hub of the rear wheel 14, and the first transmission 52 can include a front derailleur.

The first transmission 52 of each embodiment can include a rear derailleur instead of the internal hub transmission. In this case, the gear change mechanism 52A includes a rear derailleur and a plurality of sprockets.

Figure 13:
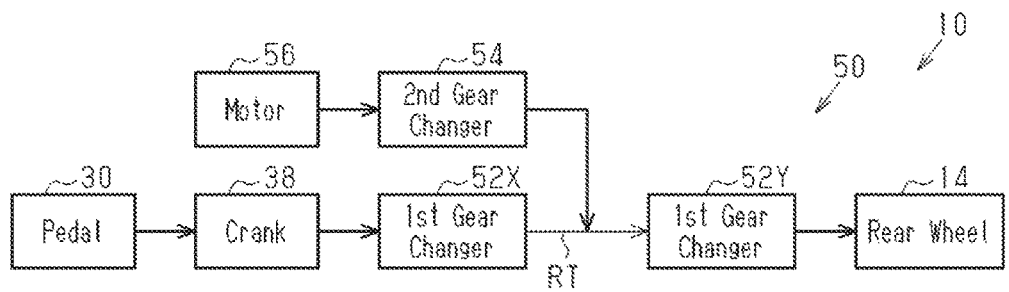
FIG. 13 is a schematic diagram of a bicycle power transmission path in accordance with a second modified example.

The transmission system 50 in each embodiment can include, for example, first transmissions 52X and 52Y as shown in FIG. 13. The first transmission 52X has the same structure as the first transmission 52 in the first to third embodiments, and the first transmission 52Y has the same structure as the first transmission 52 in the embodiment shown in FIG. 12. In this case, the electronic control unit 112 can control the second transmission 54 based on the condition of the first transmission 52X or a shift instruction to the first transmission 52X. Further, the electronic control unit 112 can control the second transmission 54 based on the condition of the first transmission 52Y or a shift instruction to the first transmission 52Y.

The planetary gear mechanisms 64 and 74A of each embodiment can be replaced by a planetary roller mechanism including a sun roller, planetary rollers, a carrier, and a ring roller. Further, the gears of each embodiment can be a spur gear or a helical gear.

Figure 14:
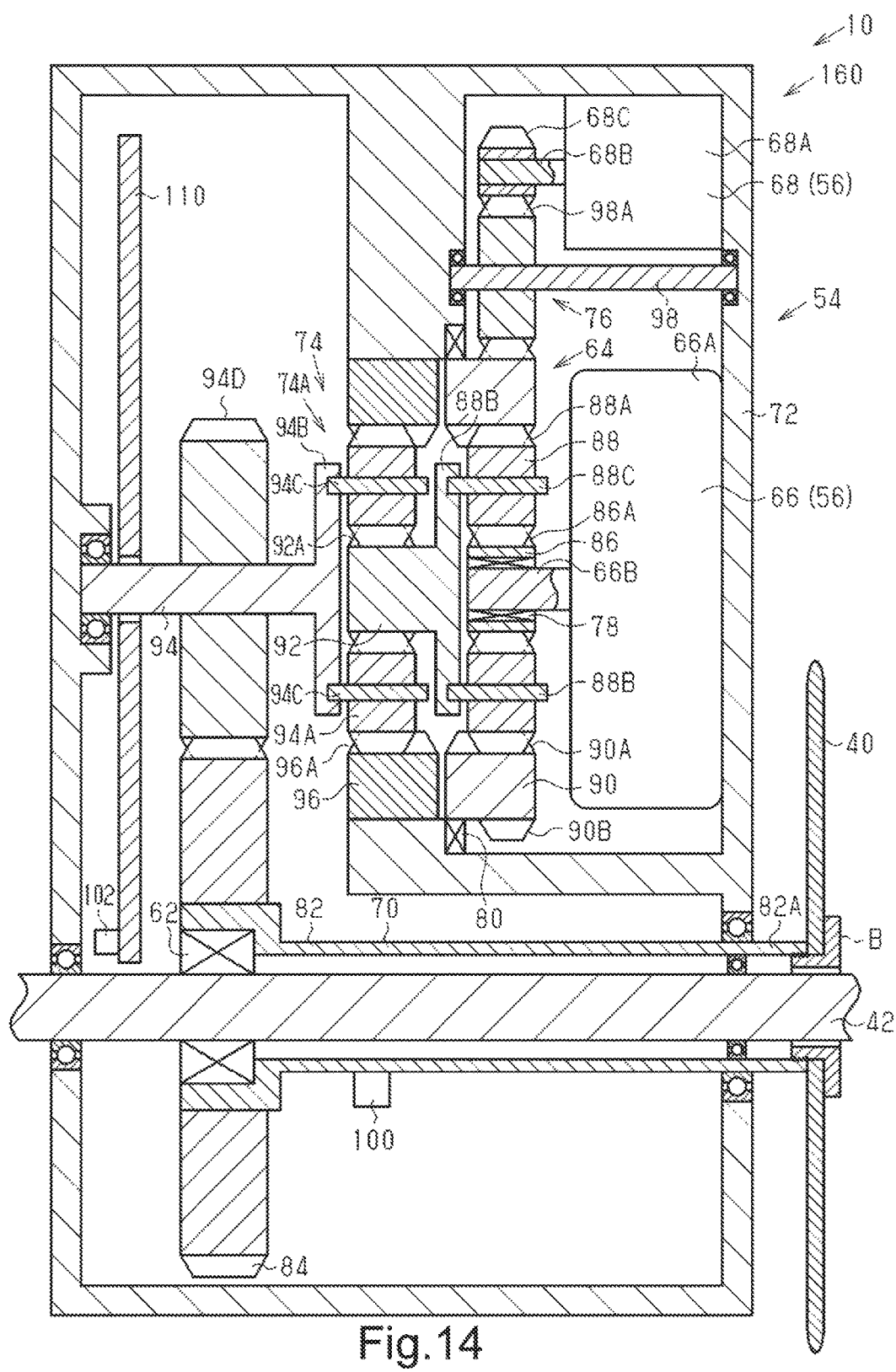
FIG. 14 is a cross-sectional view of a drive unit in accordance with a third modified example.

The structure of the drive unit 60 in each embodiment can be modified as, for example, shown in FIG. 14. FIG. 14 shows a drive unit 160 that differs from the drive unit 60 shown in FIG. 4 in only the structures of the first transmission body and the second transmission body. Same reference characters are given to those components in FIG. 14 that are the same as the corresponding components in FIG. 4. Such components will not be described in detail. The drive unit 160 is configured so that the first transmission body 90 and the second transmission body 96 are separate and rotatable relative to each other. The second one-way clutch 80 is arranged between the first transmission body 90 and the housing 72. The second transmission body 96 is arranged to be non-rotatable relative to the housing 72. Thus, the first planetary gear mechanism 64 changes the speed of the rotation received from the first motor 66 in accordance with the rotational speed of the second motor 68 and outputs the rotation to the first speed reduction mechanism 74. The second planetary gear mechanism 74A of the first speed reduction mechanism 74 constantly reduces the speed of the rotational input to the second input body 92 at a fixed speed reduction ratio and outputs the rotation from the second output body 94. Thus, the transmission ratio rX of the first planetary gear mechanism 64 is variable, and the transmission ratio rY of the second planetary gear mechanism 74A is a fixed value that is smaller than "1."

Figure 15:
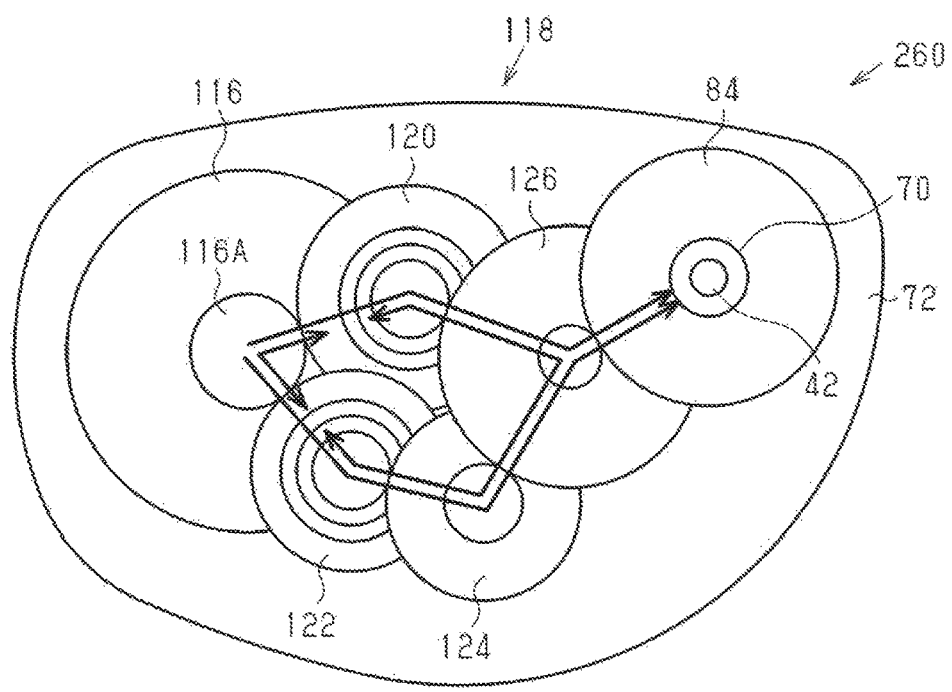
FIG. 15 is a schematic diagram of a drive unit in accordance with a fourth modified example.
Figure 16:
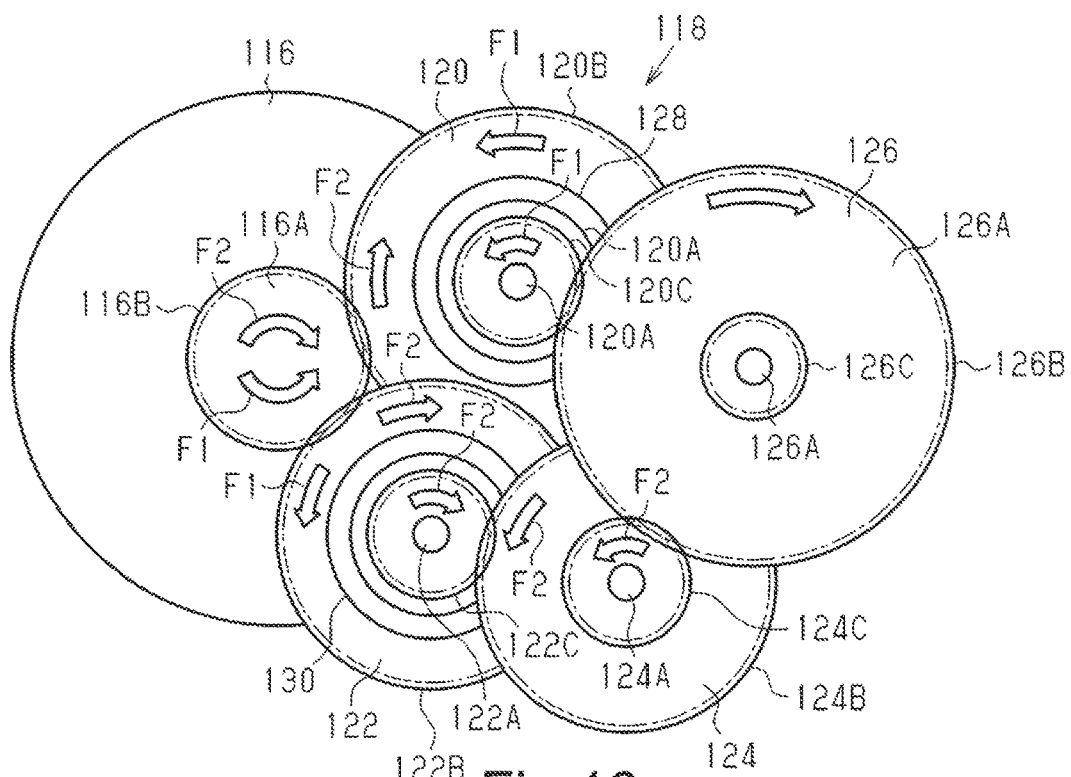
FIG. 16 is a schematic diagram of a second transmission in accordance with the fourth modified example.

The configuration of the drive unit 60 in each of the above embodiments can be modified, for example, as shown in FIGS. 15 and 16. FIG. 15 shows a drive unit 260 that differs from the drive unit 60 shown in FIG. 4 only in the configuration of the second transmission and the motor. Otherwise, the configuration of the drive unit 260 is the same as the configuration of the drive unit 60. The drive unit 260 of FIG. 15 includes a motor 116 and a second transmission 118. The motor 116 has the same configuration as the first motor 66. The second transmission 118 has two shift stages. The second transmission 118 includes a first rotation body 120, a second rotation body 122, a third rotation body 124, and a fourth rotation body 126. The first rotation body 120 includes a first rotation shaft 120A, a first gear 120B, and a second gear 120C. The first gear 120B and the second gear 120C are rotatable about the first rotation shaft 120A.

As shown in FIG. 16, the first gear 120B is engaged with a gear 116B arranged on an output shaft 116A of the motor 116. A first one-way clutch 128 couples the first gear 120B and the second gear 120C.

The second rotation body 122 includes a second rotation shaft 122A, a first gear 122B, and a second gear 122C. The first gear 122B and the second gear 122C are rotatable about the second rotation shaft 122A. The first gear 122B is engaged with the gear 116B, which is arranged on the output shaft 116A of the motor 116. A second one-way clutch 130 couples the first gear 122B and the second rotation shaft 122A. The third rotation body 124 includes a third rotation shaft 124A, a first gear 124B, and a second gear 124C. The first gear 124B and the second gear 124C are rotatable about the third rotation shaft 124A. The first gear 124B and the second gear 124C are coupled to rotate integrally with each other or formed integrally with each other. The first gear 124B is engaged with the second gear 122C of the second rotation body 122.

The fourth rotation body 126 includes a fourth rotation shaft 126A, a first gear 126B, and a second gear 126C. The first gear 126B and the second gear 126C are rotatable about the fourth rotation shaft 126A. The first gear 126B and the second gear 126C are coupled to rotate integrally with each other or formed integrally with each other. The first gear 126B is engaged with the second gear 120C of the first rotation body 120 and the second gear 124C of the third rotation body 124. The second gear 126C is engaged with the gear 84, which is formed by the outer circumference of the resultant force member 70 shown in FIG. 15.

When the first one-way clutch 128 receives the rotation of the first gear 120B of the first rotation body 120 in the first direction F1, the first one-way clutch 128 rotates the second gear 120C in the first direction F1. When the first one-way clutch 128 receives rotation of the first gear 120B of the first rotation body 120 in the second direction F2, the first one-way clutch 128 does not transmit the rotation to the second gear 120C. When the second one-way clutch 130 receives the rotation of the first gear 122B of the second rotation body 122 in the second direction F2, the second one-way clutch 130 rotates the second gear 122C in the second direction F2. When the second one-way clutch 130 receives rotation of the first gear 122B of the second rotation body 122 in the first direction F1, the second one-way clutch 130 does not transmit the rotation to the second gear 122C. Depending on the rotation direction of the motor 116, the fourth rotation body 126 receives either one of rotation from the motor 116 via the first rotation body 120 and rotation from the motor 116 via the second rotation body 122 and the third rotation body 124. The rotation of the motor 116 is transmitted via the first rotation body 120 to the fourth rotation body 126 with a transmission ratio that differs from the transmission ratio when the rotation of the motor 116 is transmitted via the second rotation body 122 and the third rotation body 124. In this manner, the electronic control unit 112 switches the transmission ratio of the second transmission 118 by changing the transmission ratio of the second transmission 118.

Figure 17:
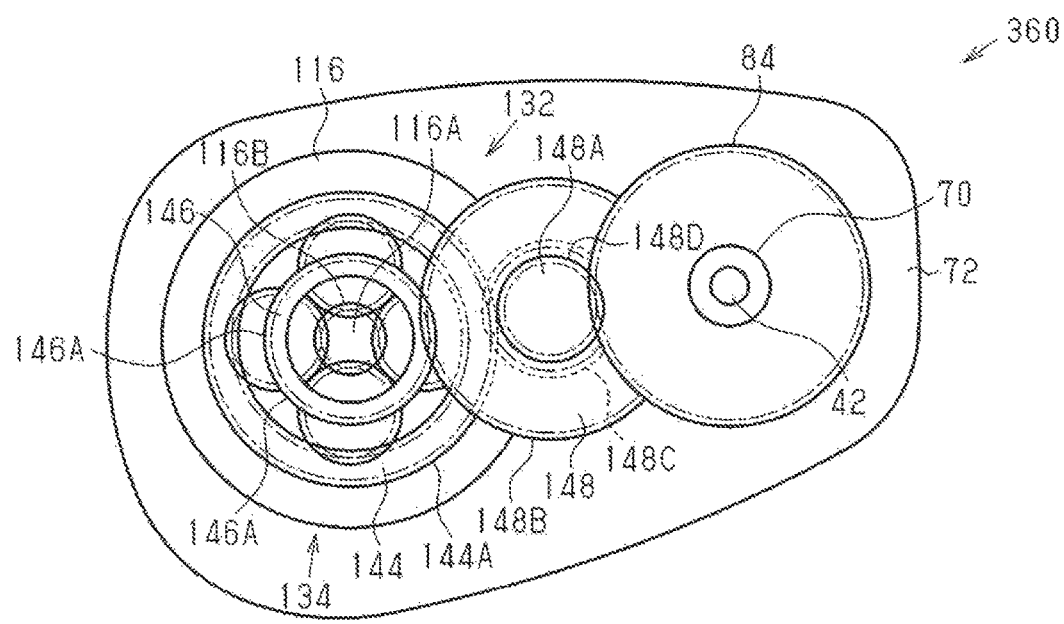
FIG. 17 is a schematic diagram of a drive unit in accordance with a fifth modified example.
Figure 18:
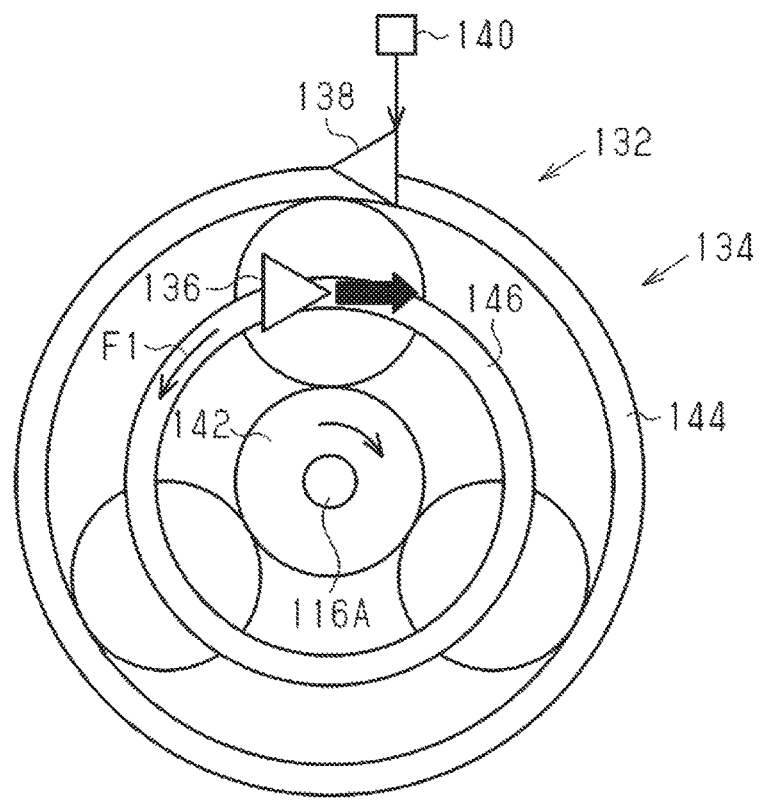
FIG. 18 is a schematic diagram showing a second transmission in a first state in accordance with the fifth modified example.
Figure 19:
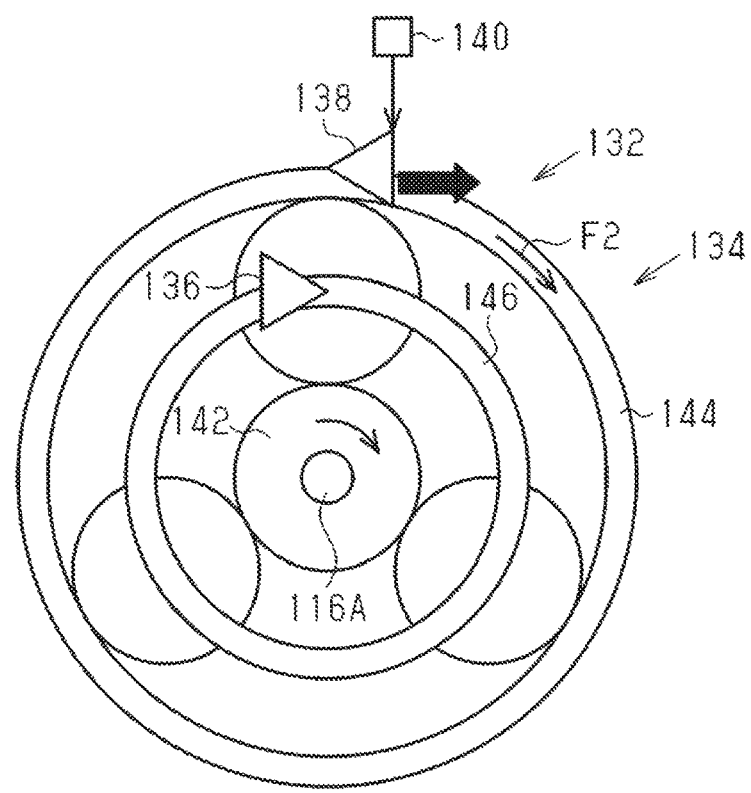
FIG. 19 is a schematic diagram showing the second gear in a second state in accordance with the fifth modified example.

The configuration of the drive unit 60 in each of the above embodiments can be modified, for example, as shown in FIGS. 17 to 19. FIG. 17 shows a drive unit 360 that differs from the drive unit 260 shown in FIG. 16 only in the configuration of the second transmission and the motor. Otherwise, the configuration of the drive unit 360 is the same as the configuration of the drive unit 260. The drive unit 360 of FIG. 17 includes the motor 116 and a second transmission 132. The second transmission 132 includes a planetary gear mechanism 134, a first one-way clutch 136, a second one-way clutch 138, a switching mechanism 140, and a rotation body 148.

The planetary gear mechanism 134 shown in FIG. 18 includes a sun gear 142, a ring gear 144, and a carrier 146. The sun gear 142 is arranged on the output shaft 116A of the motor 116 and rotated integrally with the output shaft 116A. The first one-way clutch 136 is located between the carrier 146 and the housing 72 shown in FIG. 17 to restrict rotation of the carrier 146 relative to the housing 72 in the first direction F1. The second one-way clutch 138 is located between the ring gear 144 and the housing 72 shown in FIG. 17 to restrict rotation of the ring gear 144 relative to the housing 72 in the second direction F2. The switching mechanism 140 switches the second one-way clutch 138 between states permitting and restricting rotation of the ring gear 144 in the second direction.

The rotation body 148 includes a rotation shaft 148A, a first gear 148B, a second gear 148C, and a third gear 148D. The first gear 148B, the second gear 148C, and the third gear 148D are rotatable about the rotation shaft 148A. The first gear 148B, the second gear 148C, and the third gear 148D are coupled to rotate integrally with one another or formed integrally with one another. The first gear 148B differs from the second gear 148C in the number of teeth. The first gear 148B is engaged with a gear 146A arranged on the outer circumferential portion of the carrier 146. The second gear 148C is engaged with a gear 144A arranged on the outer circumferential portion of the ring gear 144. The third gear 148D is engaged with the gear 84 formed on the outer circumference of the resultant force member 70.

When the motor 116 generates rotation in one direction and transmits rotation force in the second direction F2 to the carrier 146, the second one-way clutch 138 and the switching mechanism 140 restrict rotation of the ring gear 144 in the second direction F2. In this case, the rotation of the carrier 146 in the second direction F2 is transmitted via the gear 146A, the first gear 148B, and the third gear 148D to the outer circumferential portion of the resultant force member 70.

When the motor 116 generates rotation in the other direction and transmits rotation force in the first direction to the carrier 146, the first one-way clutch 136 restricts rotation of the carrier 146 in the first direction. Further, the second one-way clutch 138 and the switching mechanism 140 permit rotation of the ring gear 144 in the second direction. In this case, the rotation of the ring gear 144 in the second direction is transmitted via the gear 144A, the second gear 148C, and the third gear 148D to the gear 84, which is arranged on the outer circumferential portion of the resultant force member 70.

The transmission ratio of the rotation of the motor 116 when transmitted via the carrier 146 to the rotation body 148 is smaller than the transmission ratio when transmitted via the ring gear 144 to the rotation body 148. Thus, the transmission ratio of the second transmission 132 can be switched by switching the rotation direction of the motor 116.

Figure 20:
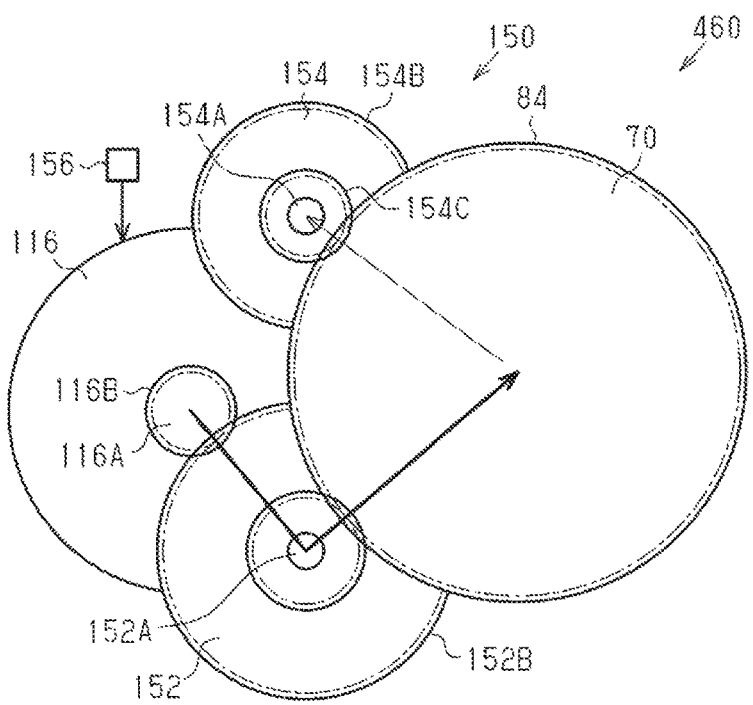
FIG. 20 is a schematic diagram showing a second transmission in a first state in accordance with a sixth modified example.
Figure 21:
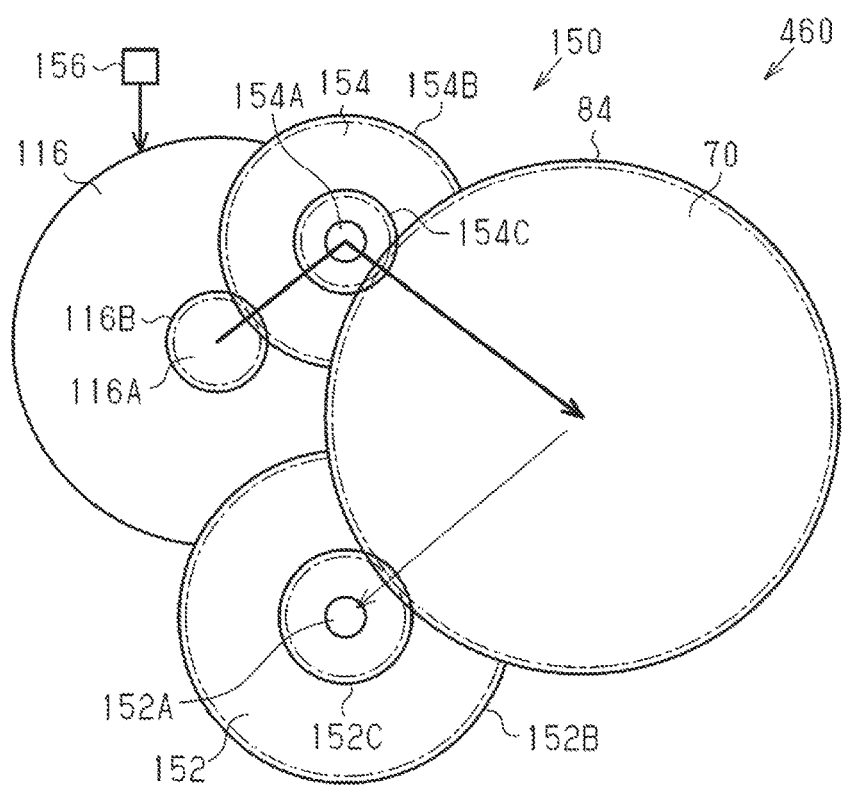
FIG. 21 is a schematic diagram showing a second transmission in a second state in accordance with the sixth modified example.

The configuration of the drive unit 60 in each of the above embodiments can be modified, for example, as shown in FIGS. 20 and 21. FIGS. 20 and 21 show a drive unit 460 that differs from the drive unit 260 shown in FIG. 16 only in the configuration of the second transmission. Otherwise, the configuration of the drive unit 460 is the same as the configuration of the drive unit 260. The drive unit 460 of FIG. 20 includes the motor 116 and a second transmission 150. The second transmission 150 includes a first rotation body 152, a second rotation body 154, and a moving mechanism 156. The first rotation body 152 and the second rotation body 154 are configured to transmit rotation to the gear 84 of the resultant force member 70.

The first rotation body 152 includes a rotation shaft 152A, a first gear 152B, and a second gear 152C. The first gear 152B and the second gear 152C are rotatable about the rotation shaft 152A. The first gear 152B and the second gear 152C are coupled to rotate integrally with each other or formed integrally with each other. The second gear 152C is engaged with the gear 84 of the resultant force member 70. The second rotation body 154 includes a rotation shaft 154A, a first gear 154B, and a second gear 154C. The first gear 154B and the second gear 154C are rotatable about the rotation shaft 154A. The first gear 154B and the second gear 154C are coupled to rotate integrally with each other or formed integrally with each other. The second gear 154C is engaged with the gear 84 of the resultant force member 70.

The moving mechanism 156 is configured to move the motor 116 in a direction orthogonal to the rotation shaft of the motor 116. The moving mechanism 156 switches the gear 116B, which is arranged on the output shaft 116A of the motor 116, between a state engaged with the first gear 152B of the first rotation body 152 as shown in FIG. 20 and a state engaged with the first gear 154B of the second rotation body 154. The first gear 152B of the first rotation body 152 differs from the first gear 154B of the second rotation body 154 in the number of teeth and/or the second gear 152C of the first rotation body 152 differs from the second gear 154C of the second rotation body 154 in the number of teeth. This changes the transmission ratio in accordance with the path through which power is transmitted. The electronic control unit 112 moves the motor 116 so that the gear 116B is selectively engaged with the first gear 152B and the first gear 154B to switch the transmission ratio of the second transmission 150.

Figure 22:
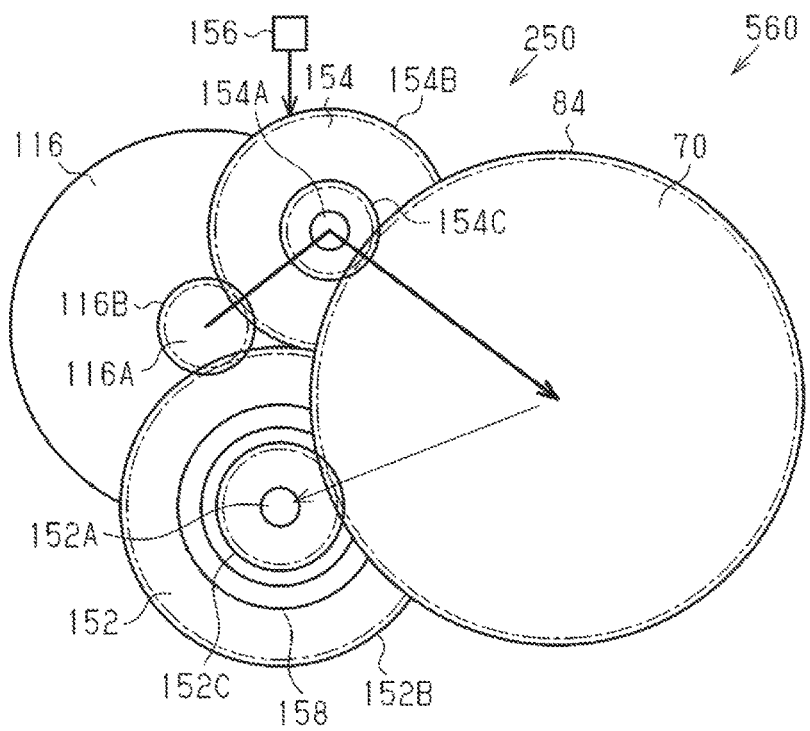
FIG. 22 is a schematic diagram showing the second transmission in accordance with a modified example of the sixth modified example.

The drive unit 460 of FIGS. 20 and 21 can be modified as shown in FIG. 22. FIG. 22 shows a drive unit 560 that differs from the drive unit 460 shown in FIGS. 20 and 21 only in the configuration of the second transmission. Otherwise, the configuration of the drive unit 560 is the same as the configuration of the drive unit 460. The moving mechanism 156 of a second transmission 250 in FIG. 22 moves the second rotation body 154 in a direction orthogonal to the axial direction. The gear 116B of the motor 116 is constantly engaged with the first gear 152B of the first rotation body 152. The moving mechanism 156 switches the first gear 154B of the second rotation body 154 between a state engaged with the gear 116B of the motor 116 and a state disengaged from the gear 116B of the motor 116. The second gear 152C of the first rotation body 152, which is engaged with the gear 84 of the resultant force member 70, is connected by the one-way clutch 158 to the first gear 152B. The second gear 152C of the first rotation body 152 differs from the first gear 154B of the second rotation body 154 in the number of teeth. When the first gear 154B of the second rotation body 154 is engaged with the gear 116B of the motor 116, the rotation transmitted from the second rotation body 154 via the resultant force member 70 to the first rotation body 152 is faster than the rotation transmitted from the motor 116 to the first rotation body 152. Under this situation, the one-way clutch 158 functions to relatively rotate the second gear 152C of the first rotation body 152 and the first gear 152B of the first rotation body 152. In this manner, the electronic control unit 112 moves the second rotation body 154 to switch the transmission ratio of the second transmission 150.

The first one-way clutch 78 can be omitted from the drive unit 60 in each of the above embodiments. In such a case, the sun gear 86A can be formed on the outer circumferential portion of the output shaft 66B. Further, the first one-way clutch 78 can be located between the first output body 88 and the second input body 92, between the second output body 94 and the gear 94D, or between the resultant force member 70 and the gear 84. As long as the first one-way clutch 78 can restrict transmission of human power to the output shaft 66B of the second motor 68 when the crankshaft 42 is rotated forward, the first one-way clutch 78 can be located at any position in the drive path from the output shaft of the second motor 68 to the resultant force member 70.

The crankshaft 42 can be omitted from the drive unit 60 of each of the above embodiments. In this case, the drive unit 60 includes the crankshaft 42 as an element that configures the bicycle.

In each of the above embodiment, a resultant force member can be configured by the crankshaft 42. In this case, the resultant force member 70 is omitted, and the rotation of the first speed reduction mechanism 74 is transmitted to the crankshaft 42.

The first clutch 62 can be omitted from each of the above embodiments.

In each of the above embodiments, the controller 110 can be arranged outside the housing 72 on the frame 22 of the bicycle 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle transmission system. Accordingly, these directional terms, as utilized to describe the bicycle driving device should be interpreted relative to a bicycle in an upright riding position on a horizontal surface and that is equipped with the bicycle driving device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle controller configured to be mounted on a bicycle including a first transmission having at least two shift stages and configured to change a ratio of rotation of a wheel to a rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank, the second transmission being different from the first transmission, the bicycle controller comprising:
   an electronic control unit having a processor programmed to control the second transmission in accordance with a condition of the bicycle and one of a condition of the first transmission and a shift instruction to the first transmission, the processor being programmed to control the second transmission to change a ratio of the rotation of the wheel to a rotation of the motor.

2. The bicycle controller according to claim 1, wherein the condition of the bicycle includes at least one of torque produced by the human power and a rotational speed of the crank and the motor.

3. The bicycle controller according to claim 1, wherein the electronic control unit is configured to operate the first transmission and the second transmission in at least one of a predetermined order and simultaneously operates the first transmission and the second transmission.

4. The bicycle controller according to claim 1, wherein the second transmission has an input portion and an output portion, the input portion is coupled to the motor, the output portion is coupled to one of an upstream side and a downstream side of the first transmission.

5. The bicycle controller according to claim 4, wherein the controller is configured to control the second transmission to change a transmission ratio of the input portion to the output portion, the second transmission having a plurality of transmission ratios and the controller being configured to select one transmission ratio of the plurality of transmission ratios.

6. The bicycle controller according to claim 1, wherein the second transmission is configured to be arranged in a housing that is attached to a crankshaft of the bicycle.

7. A bicycle controller configured to be mounted on a bicycle including a first transmission having at least two shift stages and configured to change a ratio of rotation of a wheel to rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank, the bicycle controller comprising:
   an electronic control unit having a processor programmed to control the second transmission in accordance with a condition of the bicycle and one of a condition of the first transmission and a shift instruction to the first transmission, the condition of the bicycle including at least one of torque produced by the human power and a rotational speed of the crank and the motor,
   the electronic control unit being configured to control the second transmission to increase a transmission ratio of the second transmission upon determining operation of the first transmission causes the rotational speed to exceed a first predetermined rotational speed.

8. The bicycle controller according to claim 7, wherein the electronic control unit is configured to predict, from the rotational speed and one of a condition of the first transmission and a shift instruction to the first transmission, whether or not the operation of the first transmission will cause the rotational speed to change to a value that exceeds the first predetermined rotational speed.

9. The bicycle controller according to claim 7, wherein the electronic control unit is configured to control the second transmission to increase a transmission ratio of the second transmission upon determining the rotational speed exceeds the first predetermined rotational speed without operating the first transmission.

10. A bicycle controller configured to be mounted on a bicycle including a first transmission having at least two shift stages and configured to change a ratio of rotation of a wheel to rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank, the bicycle controller comprising:
   an electronic control unit having a processor programmed to control the second transmission in accordance with a condition of the bicycle and one of a condition of the first transmission and a shift instruction to the first transmission, the condition of the bicycle including at least one of torque produced by the human power and a rotational speed of the crank and the motor,
   the electronic control unit being configured to control the second transmission to decrease a transmission ratio of the second transmission upon determining operation of the first transmission causes the rotational speed to be lower than a second predetermined rotational speed.

11. The bicycle controller according to claim 10, wherein the electronic control unit is configured to predict, from the rotational speed and one of a condition of the first transmission and a shift instruction to the first transmission, whether or not operation of the first transmission will cause the rotational speed to change to a value that is lower than the second predetermined rotational speed.

12. The bicycle controller according to claim 10, wherein the electronic control unit is configured to control the second transmission to decrease a transmission ratio of the second transmission upon determining the rotational speed becomes lower than the second predetermined rotational speed without operating the first transmission.

13. The bicycle controller according to claim 10, wherein the electronic control unit is configured to control the second transmission to increase a transmission ratio of the second transmission upon determining operation of the first transmission causes the rotational speed to exceed a first predetermined rotational speed, the first predetermined rotational speed is higher than the second predetermined rotational speed.

14. A bicycle controller configured to be mounted on a bicycle including a first transmission having at least two shift stages and configured to change a ratio of rotation of a wheel to rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank, the bicycle controller comprising:
- an electronic control unit having a processor programmed to control the second transmission in accordance with a condition of the bicycle and one of a condition of the first transmission and a shift instruction to the first transmission, the condition of the bicycle including at least one of torque produced by the human power and a rotational speed of the crank and the motor,
- the electronic control unit being configured to control the second transmission to increase a transmission ratio of the second transmission upon determining operation of the first transmission causes the torque to be lower than a first predetermined torque.

15. The bicycle controller according to claim 14, wherein the electronic control unit is configured to predict, from the torque and one of a condition of the first transmission and a shift instruction to the first transmission, whether or not operation of the first transmission will cause the torque to a value lower than the first predetermined torque.

16. A bicycle controller configured to be mounted on a bicycle including a first transmission having at least two shift stages and configured to change a ratio of rotation of a wheel to rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank, the bicycle controller comprising:
- an electronic control unit having a processor programmed to control the second transmission in accordance with a condition of the bicycle and one of a condition of the first transmission and a shift instruction to the first transmission, the condition of the bicycle including at least one of torque produced by the human power and a rotational speed of the crank and the motor,
- the electronic control unit being configured to control the second transmission to decrease a transmission ratio of the second transmission upon determining the torque exceeds a second predetermined torque by operating the first transmission.

17. The bicycle controller according to claim 16, wherein the electronic control unit is configured to predict, from the torque and one of a condition of the first transmission and a shift instruction to the first transmission, whether or not operation of the first transmission will cause the torque to change to a value exceeding the second torque.

* * * * *